US010057630B1

(12) United States Patent
Panchaksharaiah et al.

(10) Patent No.: US 10,057,630 B1
(45) Date of Patent: Aug. 21, 2018

(54) SYSTEMS AND METHODS FOR RESUMING PLAYBACK OF MEDIA CONTENT

(71) Applicant: Rovi Guides, Inc., San Carlos, CA (US)

(72) Inventors: Vishwas Sharadanagar Panchaksharaiah, Tumkur District (IN); Vikram Makam Gupta, Bangalore (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 15/794,551

(22) Filed: Oct. 26, 2017

(51) Int. Cl.
*H04N 21/6587* (2011.01)
*H04N 21/432* (2011.01)
*H04N 21/433* (2011.01)
*G11B 27/00* (2006.01)
*G11B 27/32* (2006.01)
*H04N 7/173* (2011.01)
*H04N 21/8543* (2011.01)

(52) U.S. Cl.
CPC ....... *H04N 21/4325* (2013.01); *G11B 27/005* (2013.01); *G11B 27/329* (2013.01); *H04N 21/4333* (2013.01); *H04N 21/6587* (2013.01); *H04N 7/17318* (2013.01); *H04N 21/8543* (2013.01)

(58) Field of Classification Search
CPC ........... H04N 21/4325; H04N 21/4333; H04N 21/6587; G11B 27/005; G11B 27/329
See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |
| 6,762,797 B1 | 7/2004 | Pelletier | |
| 7,165,098 B1 | 1/2007 | Boyer | |
| 7,761,892 B2 | 7/2010 | Ellis | |
| 8,046,801 B2 | 10/2011 | Ellis | |
| 9,699,488 B2 | 7/2017 | Koser | |
| 9,805,269 B2 * | 10/2017 | Shekhar | ............. G06K 9/00751 |
| 2005/0251827 A1 | 11/2002 | Ellis | |
| 2002/0174430 A1 | 11/2005 | Ellis | |
| 2007/0073847 A1 | 3/2007 | Lee | |
| 2009/0300231 A1 | 12/2009 | Munetsugu | |
| 2010/0153885 A1 | 6/2010 | Yates | |
| 2011/0194832 A1 * | 8/2011 | Momose | .............. G11B 27/105 386/241 |

(Continued)

FOREIGN PATENT DOCUMENTS

WO   WO2008056409   5/2008

*Primary Examiner* — Nasser Goodarzi
*Assistant Examiner* — Adil Ocak
(74) *Attorney, Agent, or Firm* — Haley Guiliano LLP

(57) ABSTRACT

Systems and methods are provided herein for resuming playback of a media content. Media content is provided to the user device. The media content is paused in response to receiving a pause command. A memorability metric associated with a position where the media content was paused is determined. In response to receiving a resume command, the media content is resumed at a position that is earlier in time than the position where the media content was paused. The position where the media content is resumed is based on the memorability metric.

20 Claims, 13 Drawing Sheets

(56) References Cited

U.S. PATENT DOCUMENTS

2013/0145016 A1* 6/2013 Vantalon ............ H04N 21/2541
709/224
2013/0216198 A1 8/2013 Orr
2014/0181244 A1 6/2014 Stone
2015/0350735 A1 12/2015 Koser

* cited by examiner

1100

|  | Not-memorable Scene | Memorable Scene | Highly-memorable Scene |
|---|---|---|---|
| Poor Memory | 12 hours | 36 hours | 3 days |
| Average Memory | 1 day | 2 days | 5 days |
| Strong Memory | 3 day | 5 days | 7 days |

1202 — Determine a Plurality of Respective Additional Memorability Metrics for Each of a Plurality of Scenes that Precede the Position Where the Media Content was Paused 1204 — Identify a Scene of the Plurality of Scenes with the Highest Respective Additional Memorability Metrics 1206 — Set a Catch-up Time Value to the First Value, Such that the Resume Position for the Media Content Corresponds to a Beginning of the Identified Scene

1302 — Generate a Media Content Summary of a Portion of the Media Content Between the Resume Position and the Position Where the Media Content was Paused 1304 — Provide the Media Content Summary Instead of Providing the Portion of the Media Content Between the Resume Position and the Position Where the Media Content was Paused.

FIG. 13

SYSTEMS AND METHODS FOR RESUMING PLAYBACK OF MEDIA CONTENT

BACKGROUND

A typical television system resumes playback of a media content exactly at the point where the playback of that content was stopped or slightly before based on a predetermined amount. At best, a television system may resume playback at the beginning of a scene during which the playback of that content was stopped. However, such resumption of playback does not take into consideration how likely a given user is to remember the scene, how long the interval was between the pausing and resuming, and how inherently memorable the scene was. Consequently, a user will often resume content without being able to recollect what he or she was watching, which may lead the user to waste time rewinding the media content, or may cause the user to abandon watching the media content altogether. Such scenarios may create a poor user experience.

Furthermore, typical television systems will typically pause the content immediately when a pause command from a user is received. However, such pause commands are often not based on what the user was watching at that time but rather on the user's general availability. This results in a pause command being issued during a portion of a movie that the user may not generally remember. Consequently, when playback is resumed, the user may be unable to remember the current scene, which may create a poor user experience. Some systems may recommend a pause time to the user based on upcoming appointments scheduled by the user, or on positions that other users have commonly paused on in the past. However, such systems still fail to account for memorability of the scene, and the user may still have a poor user experience of trying to resume content from a place that was not memorable.

SUMMARY

To this end and others, in some embodiments, a media guidance application provides media content to the user device based on memorability of portions of the media content. For example, the media guidance application may provide a movie or a TV show to a user's television or a user's other device. In some embodiments, the media guidance application pauses the providing of the media content in response to receiving a pause command. For example, the media guidance application may pause a movie or TV show when a user presses a "Pause" button on a TV remote control or selects a "Pause" option on the user interface of a user device. In some embodiments, the media guidance application determines a memorability metric associated with a position where the media content was paused. For example, the media guidance application may analyze the metadata associated with the current scene and characteristics of the user to determine how long the user is likely to remember the current scene. For example, the media guidance application may determine, based on demographics of the user and popularity of the scene, that the user is likely to remember the scene for two days.

In some embodiments, the media guidance application resumes providing the media content at a position that is earlier in time than the position where the media content was paused. For example, the media guidance application may resume the playback at a point that is one or more scenes before the pause position. In some embodiments, the media guidance application may resume the playback in response to receiving a resume command from a user. For example, the media guidance application may resume a movie or TV show when a user presses a "Resume" button on a TV remote control, or selects a "Resume" option on the user device.

In some embodiments, the position where the media content is resumed by the media guidance application is based on the memorability metric. For example, if the scene has a high memorability metric, the playback may be resumed only a short time before the pause position. If the memorability metric is low, the playback may be resumed a long time before the pause position. In some embodiments, the media guidance application also accounts for how long the media content was paused. For example, if the memorability metric is "2 days," and the pause time was longer than two days, the playback may resume several scenes before the current scene. In another example, if the memorability metric was "2 days," and the pause time was less than two days, the playback may resume at the pause position or a few seconds before the pause position.

In some embodiments, the media guidance application may provide media content to the user device. For example, the media guidance application may provide a movie or TV show for display on the user's TV or computer screen. In some embodiments, the media guidance application may perform a first series of steps in response to receiving a pause command from the user. For example, the first series of steps may be performed in response to a user pressing a "Pause" button on TV remote control, or selecting a "Pause" option on the user device.

In some embodiments, the first series of steps includes pausing the providing of the media content. For example, the playback of movie may be paused on the TV screen. In another example, the playback is paused when a user closes an application that provided a movie or powers down the user device. In some embodiments, the first series of steps also includes generating a first timestamp that identifies the time at which the pause command was received from the user. For example, if the user issues the pause command at 5:55 PM on August 25, 2017, the media guidance application may store a timestamp that includes a field identifying the aforementioned time and date.

In some embodiments, the first series of steps includes determining a memorability metric of a scene associated with a position where the media content was paused based on the metadata of the scene. For example, the media guidance application may analyze metadata identifying the type of scene (e.g., action, dialogue, scenery), metadata identifying actors involved in the scene, metadata identifying social media response to the scene (e.g., Twitter activity when the scene was aired), or any other metadata related to the scene. In some embodiments, the media guidance application may classify the scene as "not memorable," "memorable," or "highly memorable." For example, an action scene with famous actors that generated a lot of social media activity may be classified as highly memorable, while a panorama scene with no actors and no social media activity generated may be classified as not memorable. Any other scoring system may also be used for determining a memorability metric.

In some embodiments, the first series of steps may include determining a user memorability profile score of the user based on a user profile. For example, the media guidance application may analyze the user's demographic data (e.g., age, gender, nationality, etc.), the user's interest in different types of scenes or genres, and the user's past behavior (e.g., the user's history of rewinding content after coming back from a pause.) In some embodiments, the media guidance application may classify the user memorability profile score as one of: "poor memory," "average memory," or "strong memory." Any other scoring system may also be used for determining the user memorability profile score.

In some embodiments, the first series of steps may include calculating a memorability time value based on the memorability metric of the scene and based on the user memorability profile score of the user. In some embodiments, the media guidance application may use a look-up table to determine what memorability time value corresponds to both the memorability metric of the scene and the user memorability profile score of the user.

In some embodiments, the media guidance application may perform a second series of steps in response to receiving a resume command from the user. For example, the second series of steps may be performed in response to a user pressing a "Resume" button on TV remote control, or selecting a "Resume" option on the user interface.

In some embodiments, the second series of steps includes generating a second timestamp that identifies the time at which the resume command was received from the user. For example, if the user issues the resume command at 5:55 PM on August 27, 2017, the media guidance application may store a second timestamp that includes a field identifying the aforementioned time and date. In some embodiments, the second series of steps includes determining a pause time value by subtracting a time value of the first timestamp from a time value of the second timestamp. For example, if the first timestamp refers to 5:55 PM, August 25 2017, and the second timestamp refers to 5:55 PM, August 27 2017, the pause time value may be set to "48 hours" or "2 days."

In some embodiments, the media guidance application may, in response to determining that the pause time value exceeds the memorability time value, set a catch-up time value to a first value. For example, if the pause time value is "3 days" while the memorability time value is "2 days," (i.e., the media content was paused for longer than the user is expected to remember the current scene), the media guidance application may set the catch-up time value to 10 minutes. In some embodiments, the "10 minutes" value is chosen by the media guidance application because it corresponds to the beginning of a scene that precedes a scene that is associated with the point where the media content was paused.

In some embodiments, the media guidance application may, in response to determining that the pause time value does not exceed the memorability time value, set the catch-up time value to a second value different from the first value. For example, if the pause time value is "1 day" while the memorability time value is "2 days," (i.e., the media content was not paused for longer than the user is expected to remember the current scene) the media guidance application may set the catch-up time value to "4 minutes." In some embodiments, the "4 minutes" value is chosen by the media guidance application because it corresponds to the beginning of the current scene. In some embodiments, the second time value may be set to "0 seconds." That is, the media guidance application may determine that no catch-up time is needed.

In some embodiments, the media guidance application may determine a resume position for the media content by subtracting the catch-up time value from a time of the position where the media content was paused. For example, if a movie was paused at 32 minutes, 20 seconds and the catch-up time value is "3 minutes," the media guidance application may resume providing the media content from 29 minutes, 20 seconds.

In some embodiments, the memorability metric of a scene is determined by the media guidance application based on at least one of: closed caption data of the scene, sound data of the scene, background music data of the scene, and audience engagement data of the scene. For example, the media guidance application may use the closed caption data of the scene, sound data of the scene, or background music data of the scene to classify the type of the scene. For example, a scene with a lot of dialogue in the closed captions may be determined to be a "dialogue scene." The media guidance application may also use the audience engagement data of the scene (e.g., social media response) to classify how memorable the scene is. For example, a scene that generated a lot of social media activity may be determined to be a scene with high audience engagement. For example, a dialogue scene with high audience engagement may get a higher memorability metric than a panorama scene with low audience engagement.

In some embodiments, the media guidance application may identify the scene associated with the position where the media content was paused based on the metadata of the scene. For example, the media guidance application may access metadata (e.g., script data) that breaks up a movie into scenes. The media guidance application may then reference the timing of the scenes to identify which scene was playing when the media content was paused. In some embodiments, the media guidance application may retrieve social media data related to the identified scene from at least one social media platform. For example, the media guidance application may determine that the media content (e.g., an episode of the "Game of Thrones" TV show) was paused at the "Red Wedding" scene. In some embodiments, the media guidance application may then retrieve an amount of references the Red Wedding scene receive on some social media platform (e.g., Facebook, Twitter, etc.). In some embodiments, the media guidance application may determine a memorability metric of a scene based on the retrieved social media data. For example, if the Red Wedding scene received a lot of attention, the memorability metric may be increased.

In some embodiments, the media guidance application may store data indicative of user's past rewinding behavior. For example, the media guidance application may determine that the user habitually rewinds movies for some period of time after resuming playback. The media guidance application may also maintain demographic information associated with the user. For example, the media guidance application may track user's age, gender, and nationality. In some embodiments, the media guidance application may determine the user memorability profile score based on the demographic information associated with the user, and the data indicative of user's past rewinding behavior. For example, an older user who typically rewinds movies after a pause may receive a lower user memorability profile score than a younger user who never rewinds movies, even after a long pause.

In some embodiments, the media guidance application may calculate the media guidance application memorability time value by selecting a time value associated with both the memorability metric of a scene and the user memorability profile score. For example, the media guidance application may use a look-up table to recover a time value associated with both the memorability metric of a scene and the user memorability profile score. In some embodiments, the memorability metric of a scene comprises one of: not-memorable score, memorable score, and highly memorable score. In some embodiments, the user memorability profile score comprises one of: poor memory, average memory, and strong memory. However, any other scores may be used, e.g., numeric scores ranging from 1-10.

In some embodiments the media guidance application may set a catch-up time value to the first value, such that the resume position for the media content corresponds to one of: the position where the media content was paused, and the beginning of the current scene. For example, if the media content was paused at 32 minutes while the scene began at 29 minutes, the media guidance application may set the catch-up time value to "3 minutes." In another example, the media guidance application may set the catch-up time to "0 minutes." In some embodiments, the media guidance application may set a catch-up time value to the first value, such that the resume position for the media content corresponds to a beginning of a previous scene that precedes the scene associated with a position where the media content was paused. For example, if the media content was paused at 32 minutes while the current scene began at 29 minutes, and a previous scene began at 24 minutes, the media guidance application may set the catch-up time value to "8 minutes."

In some embodiments, the media guidance application may determine a plurality of respective additional memorability metrics for each of a plurality of scenes that precede the position where the media content was paused. For example, the media guidance application may determine memorability metrics for five scenes preceding the current one. The media guidance application may identify a scene of the plurality of scenes with the highest memorability metric. For example, the media guidance application may determine that the one of the scenes before the current one has the highest memorability metric. In some embodiments, the media guidance application may set a catch-up time value to a first value, such that the resume position for the media content corresponds to a beginning of the identified scene. For example, if the media content was paused at 32 minutes while the previous scene with the highest memorability score began at 21 minutes, the media guidance application may set the catch-up time value to "11 minutes."

In some embodiments, the media guidance application may set a catch-up time value to the first value based on calendar data of the user. For example, if the calendar data indicates that the user is in a hurry, the catch-up time value may be reduced to give the user more time.

In some embodiments, the media guidance application may generate a media content summary of a portion of the media content between the resume position and the position where the media content was paused. For example, if the media content was paused at 32 minutes and the resume position is at 29 minutes, the media guidance application may generate a summary for three minutes of the media content between 29 minutes and 32 minutes. The summary may be generated by using fast forwarding or by generating a story book using still images. The media guidance application may then provide the media content summary instead of providing the portion of the media content between the resume position and the position where the media content was paused. For example, instead of playing three minutes of the media content between 29 minutes and 33 minutes, a one-minute summary may be provided.

Additionally, systems and methods are disclosed herein for recommending a pause position. The method includes the media guidance application providing media content to the user device. For example, the media guidance application may provide a movie or a TV show to the user's TV or another user device. The method also includes the media guidance application performing a first series of steps in response to receiving a pause command. For example, the media guidance application may receive an indication that the user pressed a "Pause" button on the TV remote control, or selected a "Pause" on the user interface.

In some embodiments, the media guidance application may determine how memorable the current scene of the media content is. For example, the media guidance application may classify the current scene as not-memorable, memorable, or highly memorable. In some embodiments, the media guidance application may determine how memorable a subsequent scene of the media content is. For example, the media guidance application may classify the subsequent scene as not-memorable, memorable, or highly memorable.

In some embodiments, the media guidance application may provide a recommendation to a user to pause the media content after the subsequent scene in response to determining that the subsequent scene is more memorable than the current scene. In some embodiments, if the current scene is ranked not-memorable, while the subsequent scene is ranked highly memorable, the media guidance application may recommend that the user should pause after the subsequent scene.

In some embodiments, the media guidance application may pause the providing of the media content at the current scene in response to determining that the subsequent scene is not more memorable than the current scene. For example, if the current scene is ranked memorable, while the subsequent scene is also ranked memorable, the media guidance application may immediately pause the providing of the media content.

In some embodiments, the media guidance application may provide media content to the user device. For example, the media guidance application may provide a movie or a TV show to user's TV or another screen. In another example, the media guidance application may provide text to the user's e-reader. In some embodiments, the media guidance application may perform a first series of steps in response to receiving a pause command from a user. For example, the media guidance application may receive an indication that the user pressed a "Pause" button on TV remote control, or selected a "Pause" option on the user interface.

In some embodiments, the first series of steps may include determining a first memorability metric associated with a current position of the media content based on metadata associated with the current position of the media content and a user profile. For example, memorability of the scenes may be determined as described above, in relation to determining a memorability metric for the purpose of intelligent media content resuming. The first series of steps may also include determining a second memorability metric associated with a future position of the media content based on metadata associated with the future position of the media content and the user profile. The second memorability metric may be determined similarly to how the first memorability metric is determined.

In some embodiments, the first series of steps may include performing a second series of steps in response to determining by the media guidance application that the difference between the second memorability metric and the first memorability metric corresponds to the memorability threshold. For example, if the first memorability metric is "1" while the second memorability metric is "6," and the threshold is "4," the media guidance application may determine that 6 minus 1 (5) is greater than 4. The media guidance application may then perform the second series of steps.

In some embodiments, the second series of steps may include generating for display a prompt recommending to the user to pause the media content at the future position of the media content in response to receiving a user request to pause the media content. For example, the prompt may read "Do you wish to pause after the next scene, because it is a lot more memorable?"

In some embodiments, in response to receiving a confirmation from the user, the media guidance application may automatically pause the providing of the media content at the future position of the media content automatically. For example, if the user clicked "Yes" in response to the aforementioned prompt, the media guidance application may pause the media content after the next scene automatically (without the user pressing the pause button or issuing a pause command).

In some embodiments, the first series of steps also includes pausing the providing of the media content at the current position of the media content, in response to determining that the difference between the second memorability metric and the first memorability metric does not correspond to the threshold. For example, if the first memorability metric is "1" while the second memorability metric is "3," and the threshold is "4," the media guidance application may determine that 3 minus 1 (2) is not greater than 4. The media guidance application may then immediately pause the providing of the media content, at the time when the pause command is received.

In some embodiments, the media guidance application may determine a first memorability metric based on at least one of closed caption data associated with the current position of the media content, sound data associated with the current position of the media content, background music data associated with the current position of the media content, and audience engagement associated with the current position of the media content. In some embodiments, the media guidance application may also determine a second memorability metric based on at least one of closed caption data associated with the future position of the media content, sound data associated with the future position of the media content, background music data associated with the future position of the media content, and audience engagement associated with the future position of the media content.

For example, the media guidance application may use the closed caption data of the scene, sound data of the scene, background music data of the scene to classify the type of the scene. For example, a scene with a lot of dialogue in the closed captions may be determined to be a "dialogue scene." The media guidance application may also use the audience engagement data of the scene (e.g., social media response) to classify how memorable the scene is. For example, a scene that generated a lot of social media activity may be determined to be a scene with high audience engagement. For example, a dialogue scene with high audience engagement may get a higher memorability metric than a panorama scene with low audience engagement.

In some embodiments, the media guidance application may identify a current scene associated with the current position of the media content, retrieve first social media data related to the identified current scene from at least one social media platform and determine the first memorability metric based on the first retrieved social media data.

For example, the media guidance application may access metadata (e.g., script data) that break up a movie into scenes. The media guidance application may then reference the timing of the scenes to identify which scene was playing when the media content was paused. In some embodiments, the media guidance application may retrieve social media data related to the identified scene from at least one social media platform. For example, the media guidance application may determine that the media content (e.g., "Game of Thrones" TV show) was paused at the Red Wedding scene. In some embodiments, the media guidance application may then retrieve the amount of references the Red Wedding scene received on some social media platforms (e.g., Facebook, Twitter, etc.). In some embodiments, the media guidance application may determine a memorability metric of a scene based on the retrieved social media data. For example, if the Red Wedding scene received a lot of attention, the memorability metric may be increased.

In some embodiments, the media guidance application may similarly identify a future scene associated with the future position of the media content, retrieve second social media data related to the future scene from at least one social media platform, and determine the second memorability metric based on the retrieved second social media data.

In some embodiments, the media guidance application may generate for display the prompt recommending to the user to pause the media content at the future position of the media content that comprises indication of how long the user must wait before pausing. For example, the prompt may read "You should pause in two minutes instead for better experience." In some embodiments, the media guidance application may generate for display a prompt recommending to the user to pause the media content at the future position of the media content that comprises generating for display a reason explaining why it would be beneficial for the user to wait before pausing. For example, the prompt may read "You should pause at the end of the next scene because the next scene is a lot more memorable."

In some embodiments, the media guidance application may also determine an interest score indicative of the user's interest in a scene associated with the current position of the media content. For example, the interest score may be generated based on tracking the user's input or any other data related to the user. In some embodiments, the media guidance application may, in response to determining that the interest score exceeds an interest threshold, adjusting the memorability threshold. For example, if the user is highly engaged with the current scene, the media guidance application may change the memorability threshold from 5 to 7. That is, a recommendation to pause later will be provided only for significantly more memorable subsequent scenes if the user is engaged with the current scene.

In some embodiments, the media guidance application may receive the user's calendar data. For example, the media guidance application may examine the list of future appointments. In some embodiments, the media guidance application may determine a busyness score based on the calendar data. For example, if the user has appointments scheduled right after the movie, the media guidance application may increase the busyness score. In some embodiments, the media guidance application may, in response to determining that the busyness score exceeds a busyness threshold, adjust the memorability threshold. For example, if the user is very busy, the media guidance application may change the memorability threshold from 5 to 9. That is, if the user is very busy, the media guidance application may almost never recommend a future pause position.

In some embodiments, the media guidance application may determine that the future position of the media content corresponds to a scene that contains a mystery revelation. For example, if the current positions of the media content is 32 minutes, the media guidance application may determine that mystery elevation occurs at 40 minutes. For example, a key plot point may be revealed at 40 minutes. The media guidance application may, in response to determining that the future position of the media content corresponds to scene that contains a mystery revelation, select a different future position of the media content before the mystery revelation. For example, the media guidance application may suggest that user should pause at 38 minutes instead of at 41 minutes. This may be done because a user is less likely to resume playback if a key mystery is already revealed.

In some embodiments, the media guidance application may segment the future portion of the media content into a plurality of future scenes. For example, the media guidance application may segment the media content based on a script or other metadata. The media guidance application may then determine respective memorability scores for each future scene of the plurality of future scenes. For example, the media guidance application may determine memorability metrics for 5 scenes following the current one. The media guidance application may then select a future position of the media content to be within a future scene of the plurality of scenes that has the highest memorability score. For example, if the third future scene has the highest memorability score, the media guidance application may suggest a pause after the third future scene.

In some embodiments, the media guidance application may receive an indication of the user's desire to receive pause position recommendations. For example, such input may be received during provisioning of the user equipment. In some embodiments, the media guidance application may generate for display the prompt recommending to the user to pause the media content at the future position of the media content only in response to receiving the user input indication of the user's desire to receive pause position recommendations. This may be done to avoid presenting prompts to a user who is not interested in such prompts.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 11 depicts an illustrative table that may be used for calculating a memorability time value in accordance with some embodiments of the disclosure;

FIG. 12 depicts an illustrative flow diagram for a process for setting a catch-up time in accordance with some embodiments of the disclosure;

FIG. 13 depicts an illustrative flow diagram for a process of providing the media content summary in accordance with some embodiments of the disclosure;

DETAILED DESCRIPTION

Figure 1A:
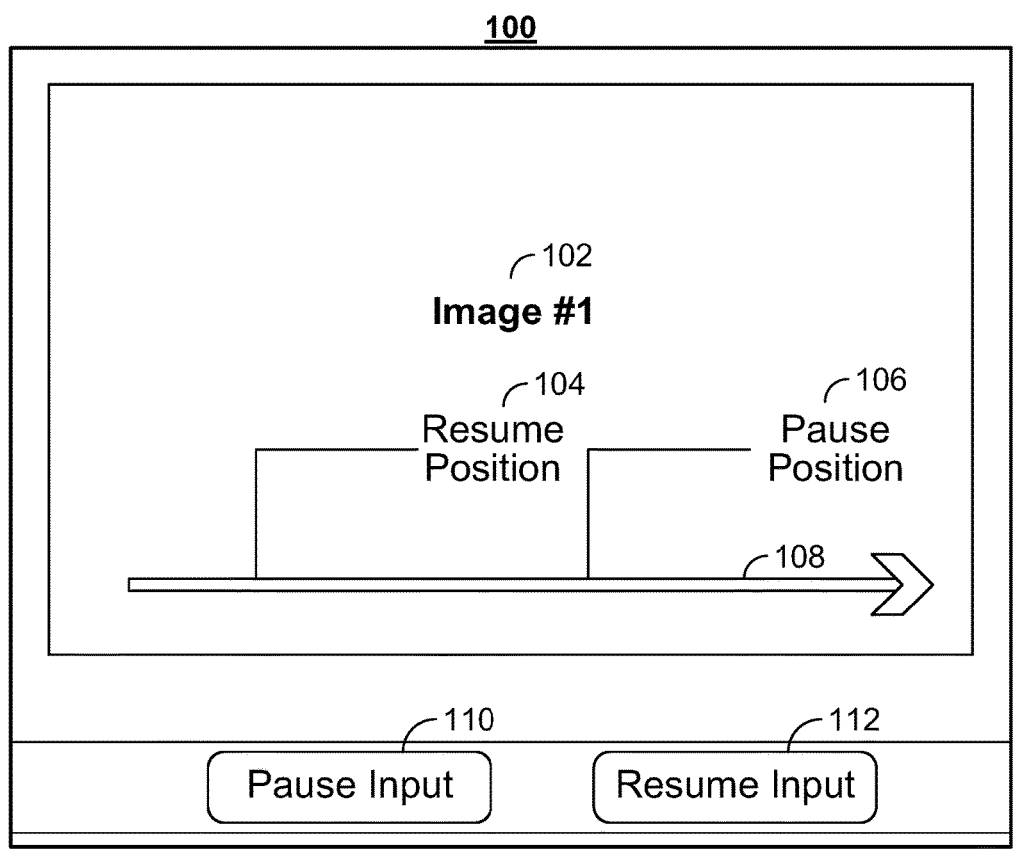
FIG. 1A shows an illustrative media guidance interface that may provide improved functionality for resuming playback of the video, in accordance with some embodiments of the disclosure.

Systems and methods are disclosed herein for an improved method of resuming a video content after it was paused by the user. The media guidance application may determine how memorable the current scene is, and for how long the media content was paused. Then the media guidance application may determine that the media content was paused for too long in relation to how memorable the scene is. That is, the media guidance application may determine that the user is unlikely to remember the current scene. In that case, the media guidance application may rewind the media content and resume playback some time before the media content was paused to refresh the user's memory. In another situation, the media guidance application may determine that the user is likely to remember the current scene, for example, because the scene was very memorable, or the user was not away for too long (or a combination of the two). In that case, the media guidance application may only slightly rewind the media content before resuming, or may do no rewinding at all. Consequently, the media guidance application improves user experience, by making sure to provide a review of content when the user may have forgotten the scene, and not rewinding the content when the user's memory is fresh.

Additionally, systems and methods are disclosed herein for providing intelligent pause recommendations. For example, the media guidance application may determine when a user tries to pause the media content, that the current scene is not very memorable. The media guidance application may also determine that a subsequent scene is a lot more memorable. In that case, the media guidance application may recommend to the user to pause after the subsequent scene, and not now. Consequently, a user's experience is improved, because the user is prompted to pause the media content at a more advantageous time. In particular, a situation where a user pauses during a non-memorable scene and then has to manually rewind to refresh his memory is avoided.

As referred to herein, the phrase "memorability metric" refers to any metric or score that assesses or indicates how memorable a media content, or a portion of a media content, is. In some embodiments, "memorability metric" may refer to an assessment of a media content as not memorable, memorable, or highly memorable. In some embodiments, "memorability metric" may refer to a numeric sore (e.g., a score in a range of 1-10), where a higher score indicates that the media content, or a portion of the media content, is comparatively more memorable, and a lower score indicates comparatively lower memorability. In some embodiments, "memorability metric" may be a memorability time value and refer to a time value that indicates how long a user can be expected to remember a media content, or a portion of a media content.

As referred to herein, the phrase "user memorability profile score" refers to any score or value that assesses or indicates the strength, or predicted strength, of a user's memory. In some embodiments, "memorability metric" may refer to assessing user's memory as weak, average, or strong. In some embodiments, "user memorability profile score" may refer to a numeric score (e.g., a score in a range of 1-10), where a higher score indicates that the user has a comparatively stronger memory, and a lower score indicates a comparatively weaker memory.

As referred to herein, the phrase "memorability time value" refers to any indication of time duration that is indicative of how long a typical user (or a specific user) can be expected to remember a media content, or a portion of a media content. For example, a memorability time value of "48 hours" can be indicative of how long a specific user can be expected to remember a specific media content, or a specific portion of a media content, for 48 hours.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1A shows an illustrative media guidance interface on a display screen that may provide improved functionality for resuming playback of the video in accordance with various embodiments of the disclosure. Display 100 shows a media guidance interface for video presentation, user interface presentation, and optional timeline presentation. In some embodiments, display 100 may display media content provided by the media guidance application. For example, display 100 may display image 102. Image 102 may be a part of media content provided by the media guidance application.

In some embodiments, display 100 may include user interface that includes pause input 110 (e.g., a button labeled "Pause") and resume input 112 (e.g., a button labeled "Resume"). In some embodiments, the media guidance application may the media content in response to detecting a user interaction with pause input 110. For example, if the user presses a button marked "Pause," the media guidance application may pause providing the media content by, for example, holding image 102 still or ceasing presentation of image 102 altogether In some embodiments, the media guidance application may optionally display a timeline 108 when the media content is paused. For example, the media guidance application may show timeline 108 overlaid over image 102, or in any other part of a display. In some embodiments, the media guidance application may also indicate on timeline 108 a marker indicative of pause position 106. For example, if media content is paused on "minute 48, pause position 106 may be labeled "48:00." In some embodiments, any other label may accompany pause position 106.

In some embodiments, the media guidance application may determine a memorability metric associated with the pause position. For example, if media content is paused on minute 48, the media guidance application may evaluate the current scene that was shown at minute 48 of the media content, and a profile of the user, to determine for what time period the user can remember the current scene. For example, the media guidance application may determine that the user can remember the current scene for 48 hours, because the scene was memorable, and the user has average memory.

In some embodiments, the media guidance application may receive a resume command. For example, the media guidance application may resume providing the media content in response to detecting a user interaction with resume input 112. For example, if the user presses a button marked "Resume," the media guidance application may resume providing the media content.

In some embodiments, the media guidance application may select a position where the providing of the media content is resumed based on the memorability metric. For example, if the memorability metric is "48 hours," and the media content was paused for longer than 48 hours, the media guidance application may resume proving the media content from a resume position 104 which precedes that pause position 106. In some embodiments, the media guidance application may, at the time when the media content is resumed, provide for display timeline 108 with a marker indicative of resume position 104. For example, if media content is resumed on minute 42, resume position 104 may be labeled "42:00." In some embodiments, any other label may accompany resume position 104. In some embodiments, a marker indicative of the original pause position 106 may also be provided for display at the same time a marker indicative of resume position 104 is displayed. For example, resume position 104 labeled "42:00" may be displayed simultaneously with the original pause position 160 labeled "48:00." An explanation may also be displayed. For example, the media guidance application may provide for display a message: "You have been away too long, your movie is being rewound by six minutes to help refresh your memory."

Figure 1B:
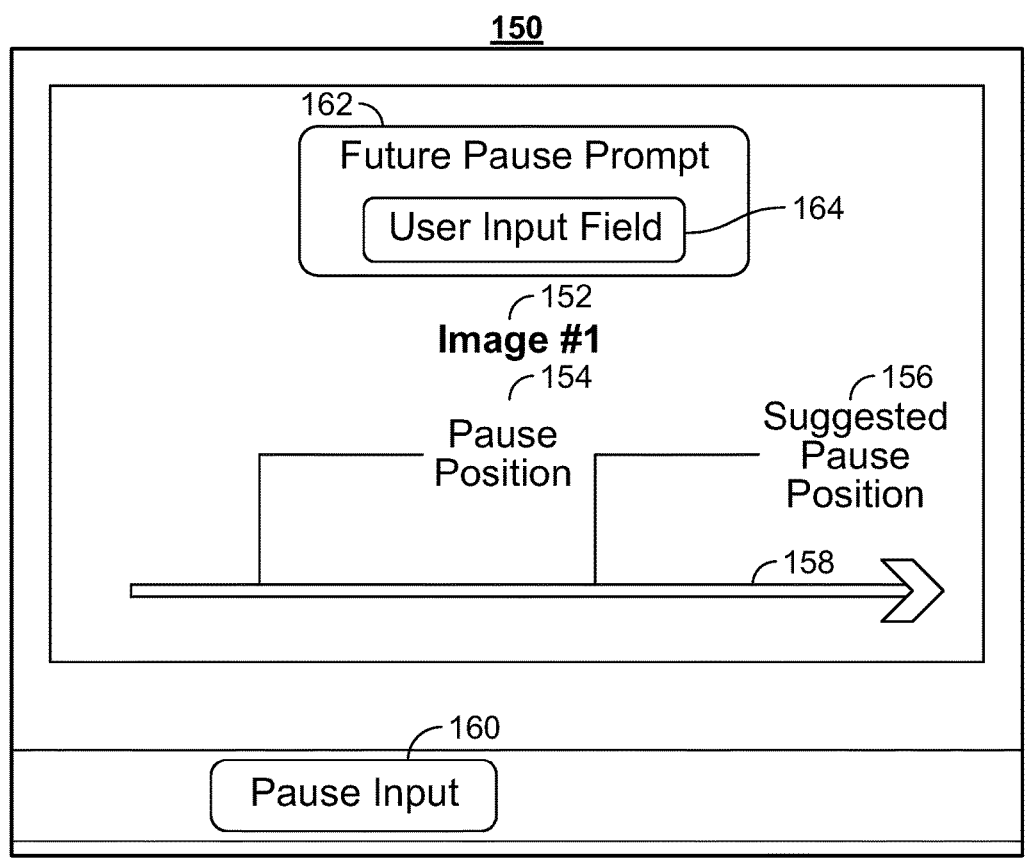
FIG. 1B shows another illustrative media guidance interface that may provide functionality for suggesting a future pause position in accordance with some embodiments of the disclosure.

FIG. 1B shows an illustrative media guidance interface on a display screen that may provide functionality for suggesting a future pause position. Display 100 shows a media guidance interface for video presentation and system prompts (e.g., future pause time suggestions). In some embodiments, display 150 may display a media content provided by the media guidance application. For example, display 100 may display image 152. Image 152 may be part of the media content provided by the media guidance application.

In some embodiments, display 100 may include user interface that includes pause input 160 (e.g., a button labeled "Pause") and future pause prompt 162. In some embodiments, future pause prompt 162 may include text and user input field 164. In some embodiments, the media guidance application may receive user input indicating a desire to pause providing of the media content. For example, such input may be received by the media guidance application in response to detecting a user interaction with pause input 160.

In some embodiments, the media guidance application may optionally display a timeline 158 when the pause request is received. For example, the media guidance application may show timeline 158 overlaid over image 152, or in any other part of a display. In some embodiments, the media guidance application may also indicate on timeline 158 a marker indicative of pause position 154. For example, if media content is paused on minute 48, pause position 154 may be labeled "48:00." In some embodiments, any other label may accompany pause position 154.

In some embodiments, in response to receiving a pause command, the media guidance application may determine how memorable a current scene (e.g., a scene associated with the pause position 154) is. In some embodiments, in response to receiving a pause command, the media guidance application may also determine how memorable a subsequent scene (e.g., a scene immediately following a scene associated with the pause position 154, or another that is later than the current scene) is.

In some embodiments, in response to determining that the subsequent scene is more memorable, the media guidance application may provide a recommendation for a user to pause the media content after the subsequent scene. For example, if the current scene is deemed not memorable, and the scene immediately following the current scene is deemed highly memorable, the media guidance application may provide a recommendation to automatically pause after the scene immediately following the current scene.

In some embodiments, the media guidance application may, in response to determining that the subsequent scene is more memorable, provide for display a future pause prompt 162. In some embodiments, future pause prompt 162 may be overlaid over image 152 or displayed alongside image 152. For example, future pause prompt 162 may include a text, "Next scene is much more memorable than the current, would you like to pause after the next scene (four extra minutes before pausing)?" In some embodiments, the media guidance application may also display timeline 158 and a marker indicative of suggested pause position 156. In some embodiments, the media guidance application may also provide for display a marker indicative of the position where the pause command was originally received. For example, suggested pause position 156 labeled "42:00" may be displayed simultaneously with original pause position 154 labeled "38:00." In response to receiving a user selection of the option to pause after the next scene, the media guidance application may resume presenting the media content and automatically pause the media content after presenting the next scene.

Figures 2, 3:
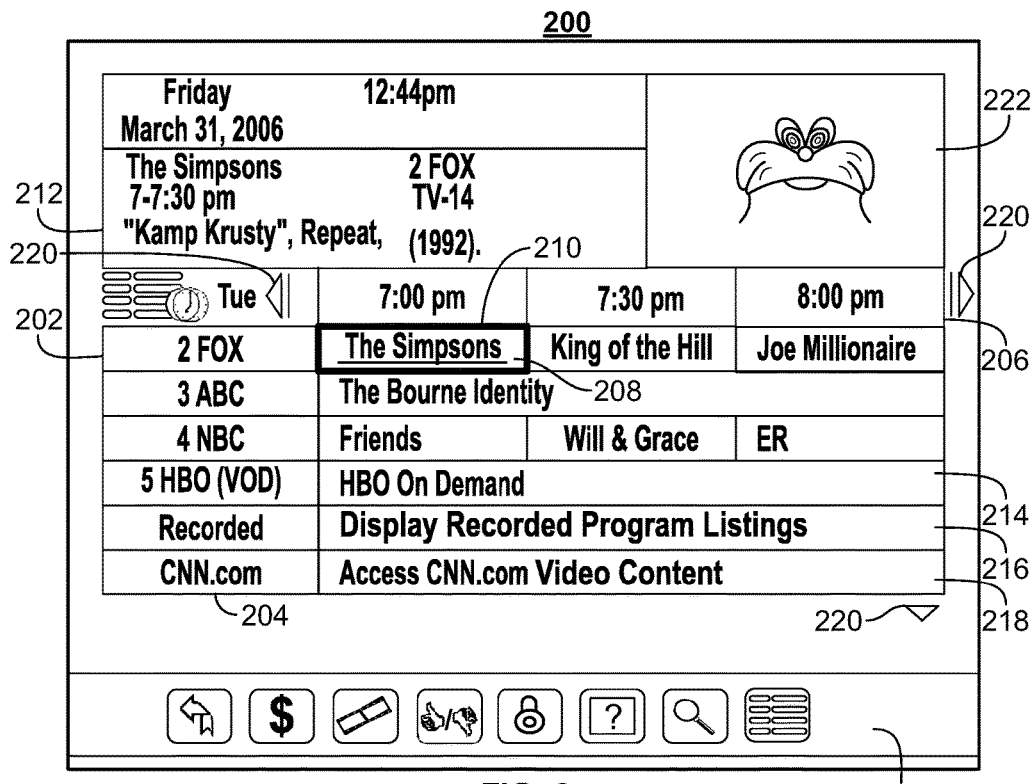
FIG. 2 shows another illustrative media guidance interface that may dynamically include or exclude a video, in accordance with some embodiments of the disclosure.
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
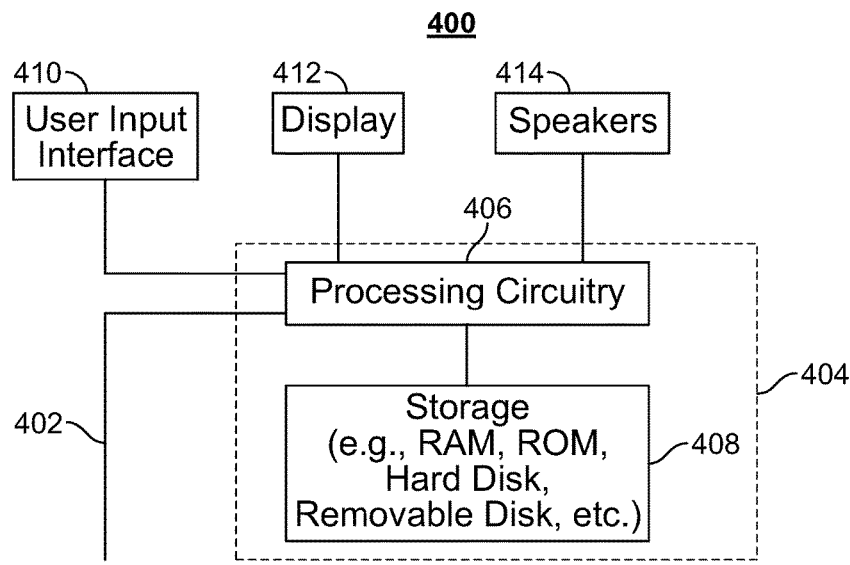
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
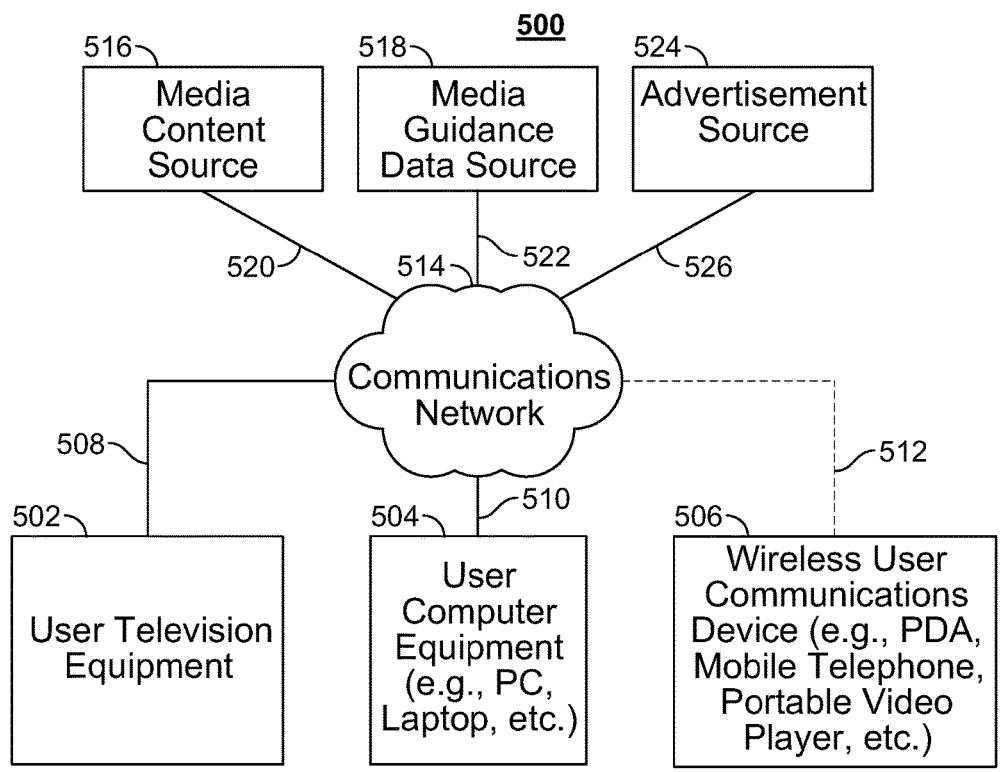
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-17 are provided below.

Figure 6:
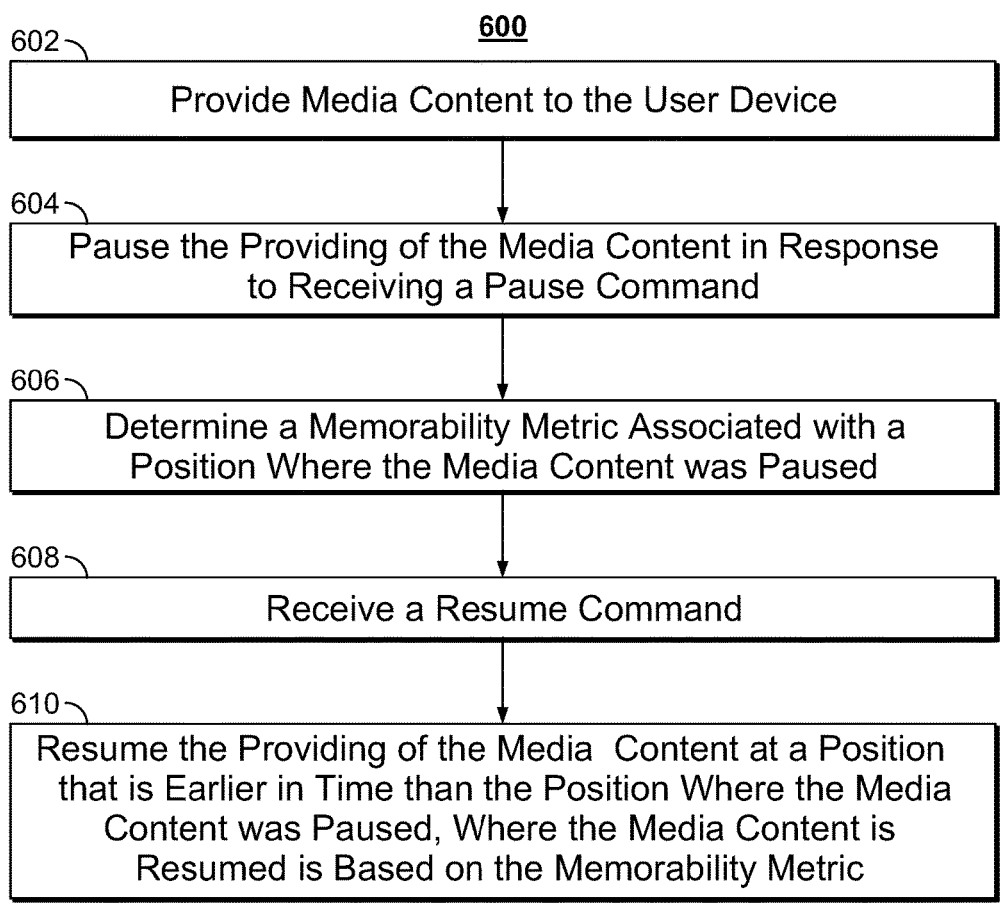
FIG. 6 depicts an illustrative flow diagram for a process of resuming providing of a media content in accordance with some embodiments of the disclosure.

FIG. 6 depicts an illustrative flow diagram of a process 600 for resuming providing of media content in accordance with an embodiment of the disclosure. Process 600 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 600 begins at 602, where control circuitry 404 provides media content to the user device. For example, the media guidance application running on control circuitry 404 may generate a media content for display on a display 412 of user television equipment 502. The media content may be generated for display by way of an explicit user selection to play the video, as a result of the user equipment being powered on, or by any other triggering event.

Process 600 continues to 604, where control circuitry 404 pauses the providing of the media content in response to receiving a pause command. In some embodiments, control circuitry 404 may receive a pause command from a user via user input interface 410. In some embodiments, control circuitry 404 may receive a pause command from a user via pause input 110 of FIG. 1A. In some embodiments, control circuitry 404 may pause providing of the media content by freezing the picture on display 412, or by turning off display 412.

Process 600 continues to 606, where control circuitry 404 may determine a memorability metric associated with a position where the media content was paused. For example, control circuitry 404 may determine a memorability metric of a current scene associate with the position where the media content was paused. In some embodiments, control circuitry 404 may determine the memorability metric by estimating for how long the user is likely to remember the scene. For example, control circuitry 404 may evaluate both metadata of the current scene and a user profile to determine that the user is likely to remember the current scene for two days. In that case, control circuitry 404 may set the memorability metric to a value of "2 days."

Process 600 continues to 608, where control circuitry 404 may receive a resume command. In some embodiments, control circuitry 404 may receive a resume command from a user via user input interface 410. In some embodiments, control circuitry 404 may receive a resume command from a user via resume input 112 of FIG. 1.

Process 600 continues to 610, where control circuitry 404 may resume the providing of the media content, wherein the media content is resumed at a position that is earlier in time than the position where the media content was paused. For example, if the media content was a paused at the 32 minute mark, control circuitry 404 may resume providing the media content from a resume position that precedes that 32 minute mark.

In some embodiments, control circuitry 404 may select the resume positions based on the memorability metric. For example, if the memorability metric was high (e.g., because the current scene was very memorable), the resume position may only slightly precede the pause position. For example, if the media content was paused at the 32 minute mark, control circuitry 404 may resume providing the media content at the 31 minute, 30 second mark. In another example, if the memorability metric was low (e.g., because the current scene was not very memorable), the resume position may significantly precede the pause position. For example, if the media content was a paused at the 32 minute mark, control circuitry 404 may resume proving the media content at the 22 minute mark.

In some embodiments, control circuitry 404 may also consider how long the media content was paused. For example, if the memorability metric was "2 days" (because the user was determined to be able to remember the scene for two days), control circuitry 404 may determine if more than two days passed between the pause command and resume command. In this example, control circuitry 404 may set the resume time further back if two days have passed, and not so far back if fewer than two days have passed. In some embodiments, control circuitry 404 may set the resume positions to be exactly the pause position, because control circuitry 404 may have determined that the user is highly likely to remember the scene.

Figure 7:
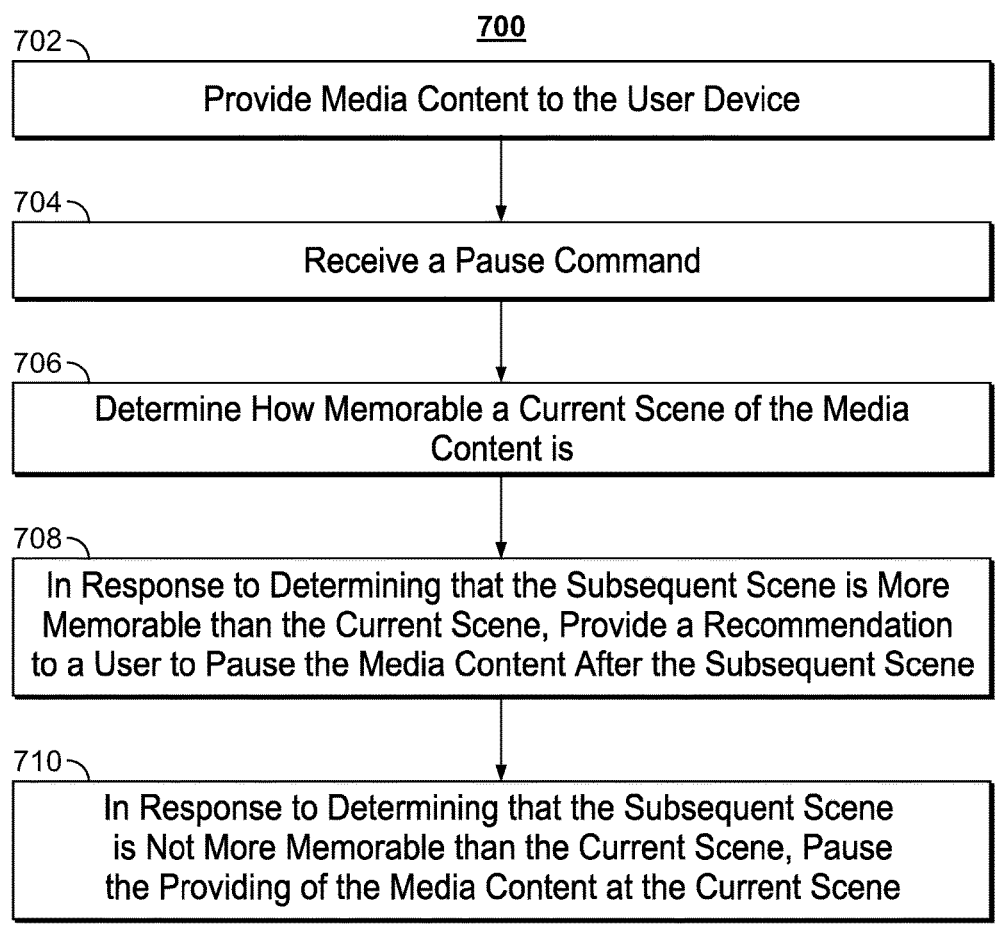
FIG. 7 depicts an illustrative flow diagram for a process of providing pause time recommendations in accordance with some embodiments of the disclosure.

FIG. 7 depicts an illustrative flow diagram of a process 700 for providing pause time recommendations in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 700 begins at 702, where control circuitry 404 provides media content to the user device. For example, the media guidance application running on control circuitry 404 may generate a media content for display on a display 412 of user television equipment 502. The media content may be generated for display by way of an explicit user selection to play the video, as a result of the user equipment being powered on, or by any other triggering event.

Process 700 continues to 704, where control circuitry 404 pauses the providing of the media content in response to receiving a pause command. In some embodiments, control circuitry 404 may receive a pause command from a user via user input interface 410. In some embodiments, control circuitry 404 may receive a pause command from a user via pause input 160 of FIG. 1B.

Process 700 continues to 706, where in response to receiving a pause command, control circuitry 404 determines how memorable the current scene of the media content is. In some embodiments, control circuitry 404 may classify the scene as not memorable, memorable, or highly memorable. For example, an action scene with famous actors that generated a lot of social media activity may be classified as highly memorable, while a panorama scene with no actors and no social media activity generated may be classified as not memorable. In some embodiments, control circuitry 404 may assign a numerical memorability score to the current scene. In some embodiments, control circuitry 404 may determine for how long a user can be expected to remember the current scene.

Process 700 continues to 708, where in response to receiving a pause command, control circuitry 404 determines how memorable a subsequent scene of the media content is. In some embodiments, control circuitry 404 may classify the subsequent scene as not memorable, memorable, or highly memorable. For example, an action scene with famous actors that generated a lot of social media activity may be classified as highly memorable, while a panorama scene with no actors and no social media activity generated may be classified as not memorable. In some embodiments, control circuitry 404 may assign a numerical memorability score to the subsequent scene. In some embodiments, control circuitry 404 may determine for how long a user can be expected to remember the subsequent scene.

In some embodiments, process 700 continues to 708, where in response to receiving a pause command, and in response to determining that the subsequent scene is more memorable than the current scene, control circuitry 404 may provide a recommendation to a user to automatically pause the media content after the subsequent scene. For example, control circuitry 404 may provide for display a future pause prompt 162 as explained in relation to FIG. 1B.

In some embodiments, process 700 alternatively continues to 710, where in response to receiving a pause command, and in response to determining that the subsequent scene is not more memorable than the current scene, control circuitry 404 pauses the providing of the media content at the current scene.

Figure 8:
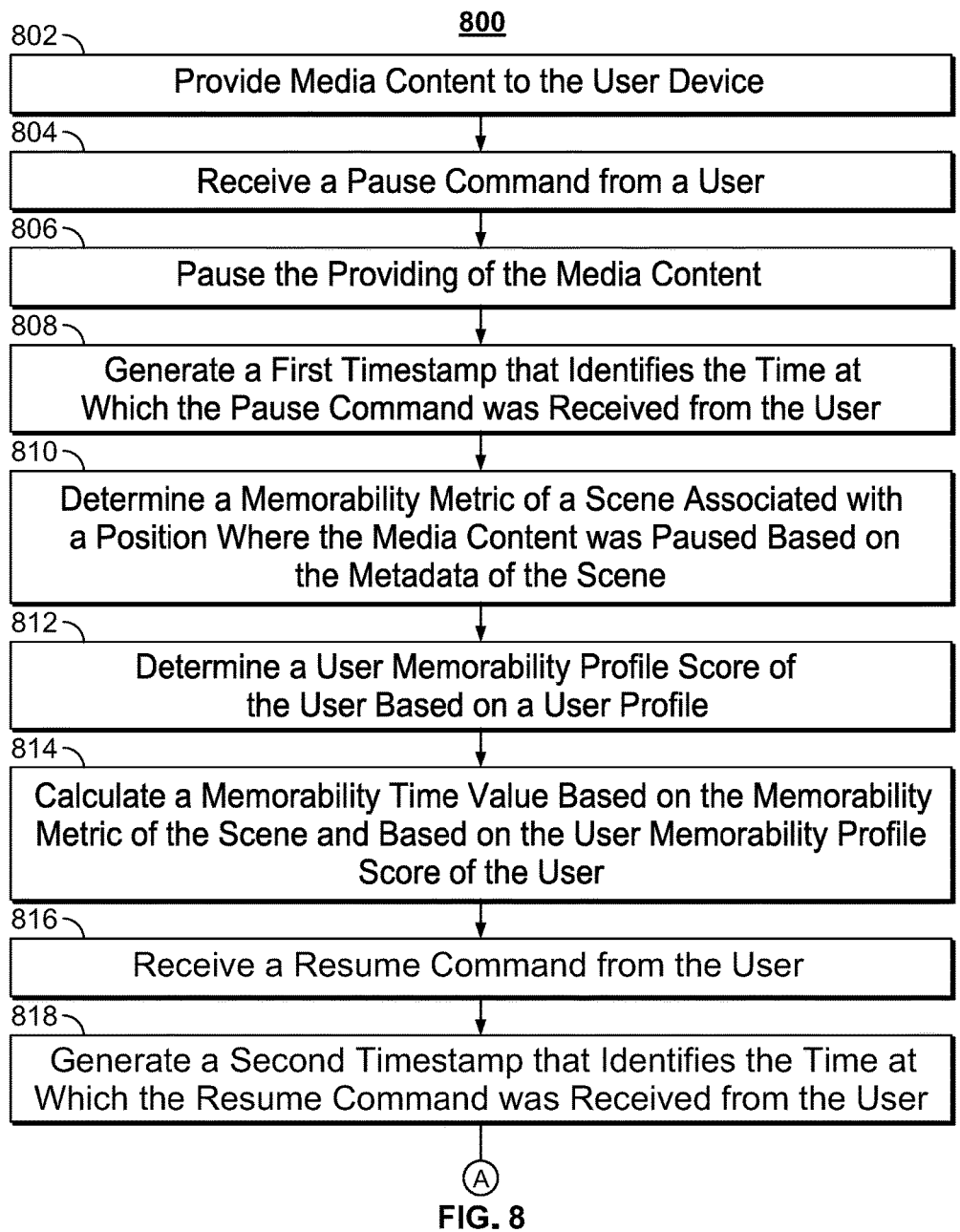
FIG. 8 depicts another illustrative flow diagram for a process of resuming providing of a media content in accordance with some embodiments of the disclosure.
Figure 8:
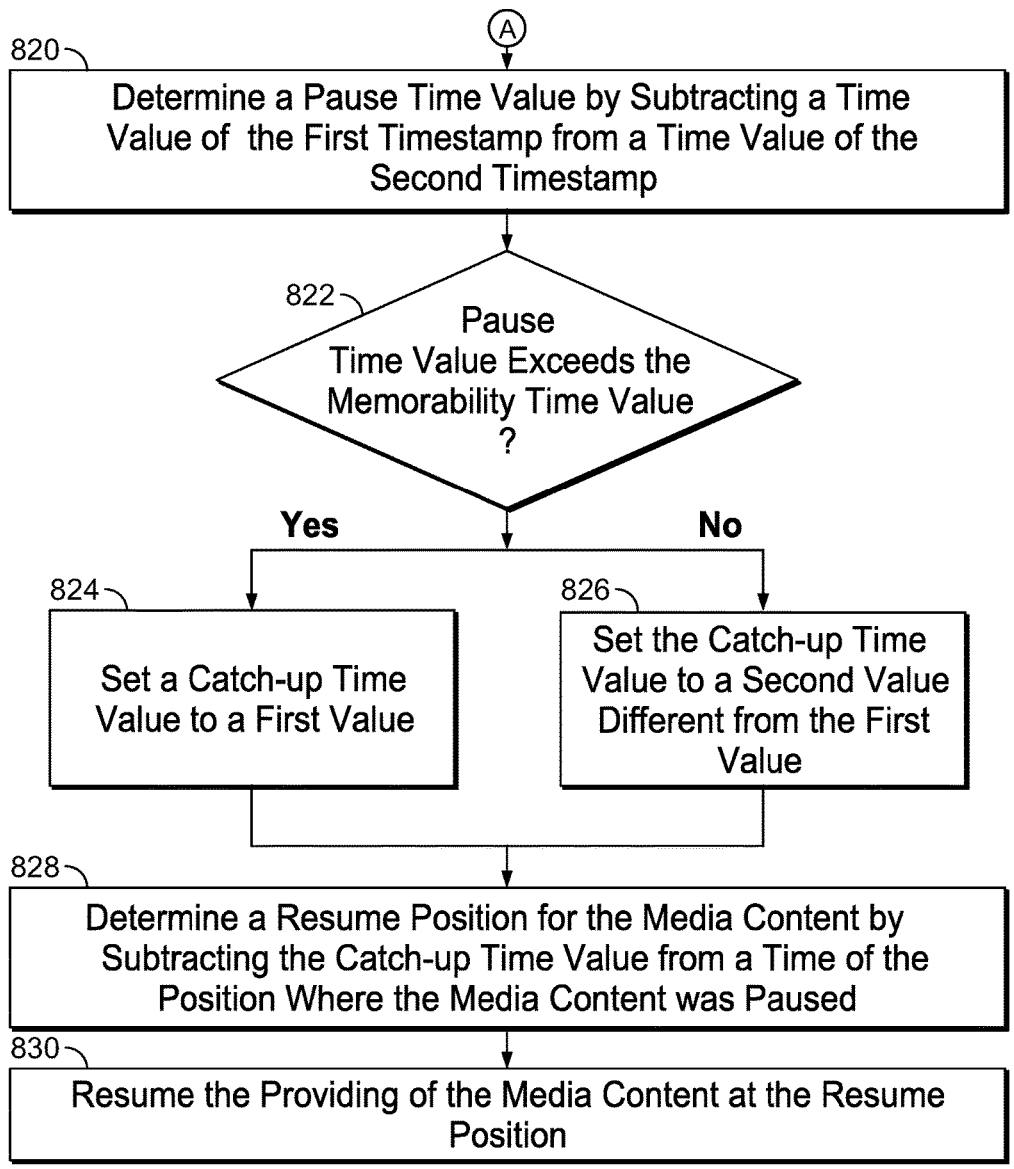

FIG. 8 depicts an illustrative flow diagram of a process 800 for resuming providing of the media content in accordance with some embodiments of the disclosure. Process 800 may be executed by control circuitry 404, for example, in a manner instructed to control circuitry 404 by the media guidance application.

Process 800 begins at 802, wherein control circuitry 404 provides media content to the user device. For example, the media guidance application running on control circuitry 404 may generate a media content for display on a display 412 of user television equipment 502. The media content may be generated for display by way of an explicit user selection to play the video, as a result of the user equipment being powered on, or by any other triggering event.

Process 800 continues to 804, where control circuitry 404 pauses the providing of the media content in response to receiving a pause command. In some embodiments, control circuitry 404 may receive a pause command from a user via user input interface 410. In some embodiments, control circuitry 404 may receive a pause command from a user via pause input 110 of FIG. 1A. Process 800 continues to 806, where control circuitry 404 may pause providing the media content in response to receiving the pause command.

Process 800 continues to 808, where control circuitry 404 may, in response to receiving the pause command from the user, generate a first timestamp that identifies the time at which the pause command was received from the user. For example, if the pause command was received at 06:28 PM on August 26, 2017, the first timestamp may include an indication of that time. For example, the first timestamp may have a field that lists a "06:28 PM, August 26, 2017" value.

Process 800 continues to 810, where control circuitry 404 may, in response to receiving the pause command from the user, determine a memorability metric of a scene associated with a position where the media content was paused based on the metadata of the scene. For example, control circuitry 404 may analyze metadata identifying the type of a scene (e.g., action, dialogue, scenery), metadata identifying actors involved in the scene, metadata identifying social media response to the scene (e.g., twitter activity when the scene was aired), or any other metadata related to the scene. In some embodiments, control circuitry 404 may classify the scene as not memorable, memorable, or highly memorable. For example, an action scene with famous actors that generated a lot of social media activity may be classified as highly memorable, while a panorama scene with no actors and no social media activity generated may be classified as not memorable. Any other scoring system may also be used as a memorability metric. For example, control circuitry 404 may assign a value on a 1-10 scale, where a higher score represents higher memorability of the scene.

In some embodiments, control circuitry 404 may determine the memorability metric of a scene based on at least one of: closed caption data of the scene, sound data of the scene, background music data of the scene, and audience engagement data of the scene. For example, control circuitry 404 may use the closed caption data of the scene, sound data of the scene, or background music data of the scene to classify the type of the scene. For example, a scene with a lot of dialogue in the closed captions may be determined to be a "dialogue scene." Control circuitry 404 may also use the audience engagement data of the scene (e.g., social media response) to classify how memorable the scene is. For example, a scene that generated a lot of social media activity may be determined to be a scene with high audience engagement. For example, a dialogue scene with high audience engagement may get a higher memorability metric than a panorama scene with low audience engagement.

Process 800 continues to 812, where control circuitry 404 may, in response to receiving the pause command from the user, determine a user memorability profile score of the user based on a user profile. For example, the control circuitry 404 may analyze user's demographic data (age, gender, nationality), user's interest in different types of scenes or genres, and user's past behavior (e.g., user's history of rewinding content after coming back from a pause). In some embodiments, control circuitry 404 may classify user memorability profile score of poor memory, average memory, or strong memory. In some embodiments, control circuitry 404 may determine the user memorability profile score based on the demographic information associated with the user, and the data indicative of the user's past rewinding behavior. For example, an older user who typically rewinds movies after a pause may receive a lower user memorability profile score than a younger user who never rewinds movies, even after a long pause.

Process 800 continues to 814, where control circuitry 404 may, in response to receiving the pause command from the user, calculate a memorability time value based on the memorability metric of the scene and based on the user memorability profile score of the user. For example, control circuitry 404 may use a look-up table to extract a time-value that correspond both to memorability metric of the scene and to the user memorability profile score of the user. In some embodiments, control circuitry 404 may use any kind of formula or other technique to calculate the memorability time value.

Process 800 continues to 816, where control circuitry 404 may receive a resume command from the user. In some embodiments, control circuitry 404 may receive a resume command from a user via user input interface 410. In some embodiments, control circuitry 404 may receive a pause command from a user via resume input 112 of FIG. 1A.

Process 800 continues to 818, where control circuitry 404 may, in response to receiving the resume command from the user, generate a second timestamp that identifies the time at which the resume command was received from the user. For example, if the resume command was received at 06:28 PM on August 28, 2017, the second timestamp may include an indication of that time. For example, the second timestamp may have a field that lists a "06:28 PM, August 28, 2017" value.

Process 800 continues to 820 where control circuitry 404 may, in response to receiving the resume command from the user, determine a pause time value by subtracting a time value of the first timestamp from a time value of the second timestamp. In some embodiments, the pause time value may represent how long the media content was paused. For example, if the first timestamp lists a "06:28 PM, August 26, 2017" value, and the second timestamp lists a "06:28 PM, August 28, 2017" value, control circuitry 404 may set the pause time value to "48 hours."

Process 800 continues to 822 where control circuitry 404 may determine if the pause time value is greater than or less than the memorability time value determined at step 814. If the pause time value exceeds the memorability time value (i.e., the media content was paused for longer than the user can be expected to remember the current scene), process 800 may continue to block 824. If the pause time value does not exceed the memorability time value (i.e., the media content was not paused for longer than the user can be expected to remember the current scene), process 800 may continue to block 826.

At block 824, control circuitry 404 may set a catch-up time value to a first value based on the memorability time value. For example, the catch-up time value may be set in such a way that the playback will be resumed prior to the current scene (e.g., automatically resuming playback with a scene that may be more memorable to the user). Process 800 may then continue to block 828. In some embodiments, control circuitry 404 may set the catch-up time value to the first value, such that the resume position for the media content corresponds to a beginning of a previous scene that precedes the scene associated with a position where the media content was paused. In some embodiments, control circuitry 404 may set the catch-up time value to the first value based on calendar data of the user. For example, if the user is busy and does not have a lot of time to watch a catch-up scene, control circuitry 404 may set the catch-up time value to the first value in such a way as to save time for the user. For example, if the control circuitry 404 would otherwise set the catch-up time to 10 minutes, control circuitry 404 may set the catch-up time to two minutes if the user is determined to be busy.

At block 826, control circuitry 404 may set a catch-up time value to a second value different from the first value. For example, the catch-up time value may be set in such a way that the playback will be resumed during the current scene. Process 800 may then continue to block 828. In some embodiments, control circuitry 404 may set the catch-up time value to the second value, such that the resume position for the media content corresponds to one of: the position where the media content was paused and the beginning of the scene.

At block 828, control circuitry 404 may determine a resume position for the media content by subtracting the catch-up time value from a time of the position where the media content was paused. For example, if the media content was paused at the 32 minute, 30 second mark and the catch-up time value is "4 minutes," the resume position may be determined to be 28 minutes, 30 seconds.

Process 800 continues to 830 where, in response to receiving a resume command from the user, control circuitry 404 resumes the providing of the media content at the resume position. For example, if the resume position was determined to be 28 minutes, 30 seconds, control circuitry 404 continues providing the media content to the user device from the 28 minute, 30 second mark. In some embodiments, control circuitry 404 may also display the timeline 108 and positions 104 and 106 as described in relation to FIG. 1A.

Figure 9:
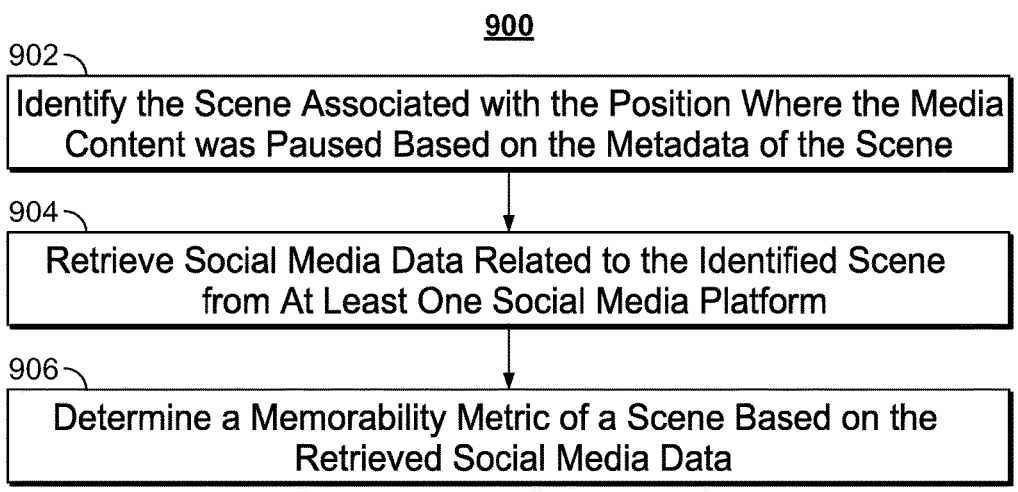
FIG. 9 depicts an illustrative flow diagram for a process of determining a memorability metric of a scene based on the retrieved social media data in accordance with some embodiments of the disclosure.

FIG. 9 depicts an illustrative flow diagram of a process 900 for determining a memorability metric of a scene based on the retrieved social media data in accordance with some embodiments of the disclosure. Process 900 may be executed by control circuitry 404 (e.g., in a manner instructed to control circuitry 404 by the media guidance application). In some embodiments, control circuitry 404 may perform process 900 as a part of block 810 described in relation to FIG. 8.

Process 900 begins at 902, wherein control circuitry 404 may identify the scene associated with the position where the media content was paused based on the metadata of the scene. For example, control circuitry 404 may access script data stored at storage 408 or received from media guidance source 518. In some embodiments, control circuitry 404 may match the time where the media content was paused with time listed in the script data. In some embodiments, control circuitry 404 may identify the scene using other techniques. For example, control circuitry 404 may determine that the media content (e.g., "Game of Thrones" TV show) was paused at the Red Wedding scene.

Process 900 continues to 904, wherein control circuitry 404 may retrieve social media data related to the identified scene from at least one social media platform. In some embodiments, the media guidance application may then count the amount of references the identified scene received on at least one social media platform (e.g., Facebook, Twitter, etc.). For example, if the identified scene is the Red Wedding scene, control circuitry 404 may count the number of references to the Red Wedding scene on at least one social media platform. The social media platform data may be provided, for example, by media guidance data source 518.

Process 900 continues to 906, wherein control circuitry 404 may determine a memorability metric of a scene based on the retrieved social media data. For example, if the memorability metric was ranked memorable, a further indication of high social media engagement with the current scene may cause control circuitry 404 to change the memorability metric to highly memorable.

Figure 10:
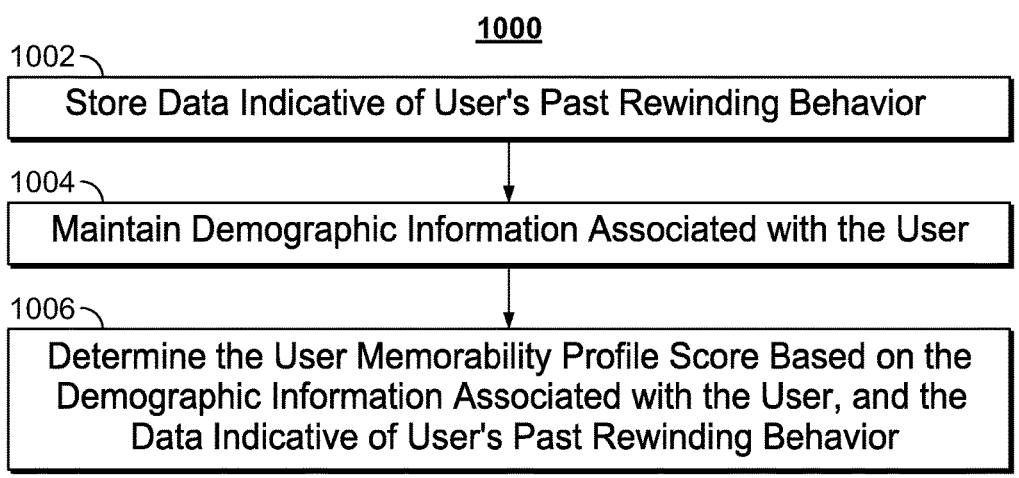
FIG. 10 depicts an illustrative flow diagram for a process of determining the user memorability profile score based on the demographic information associated with the user, and the data indicative of user's past rewinding behavior in accordance with some embodiments of the disclosure.
Figure 14:
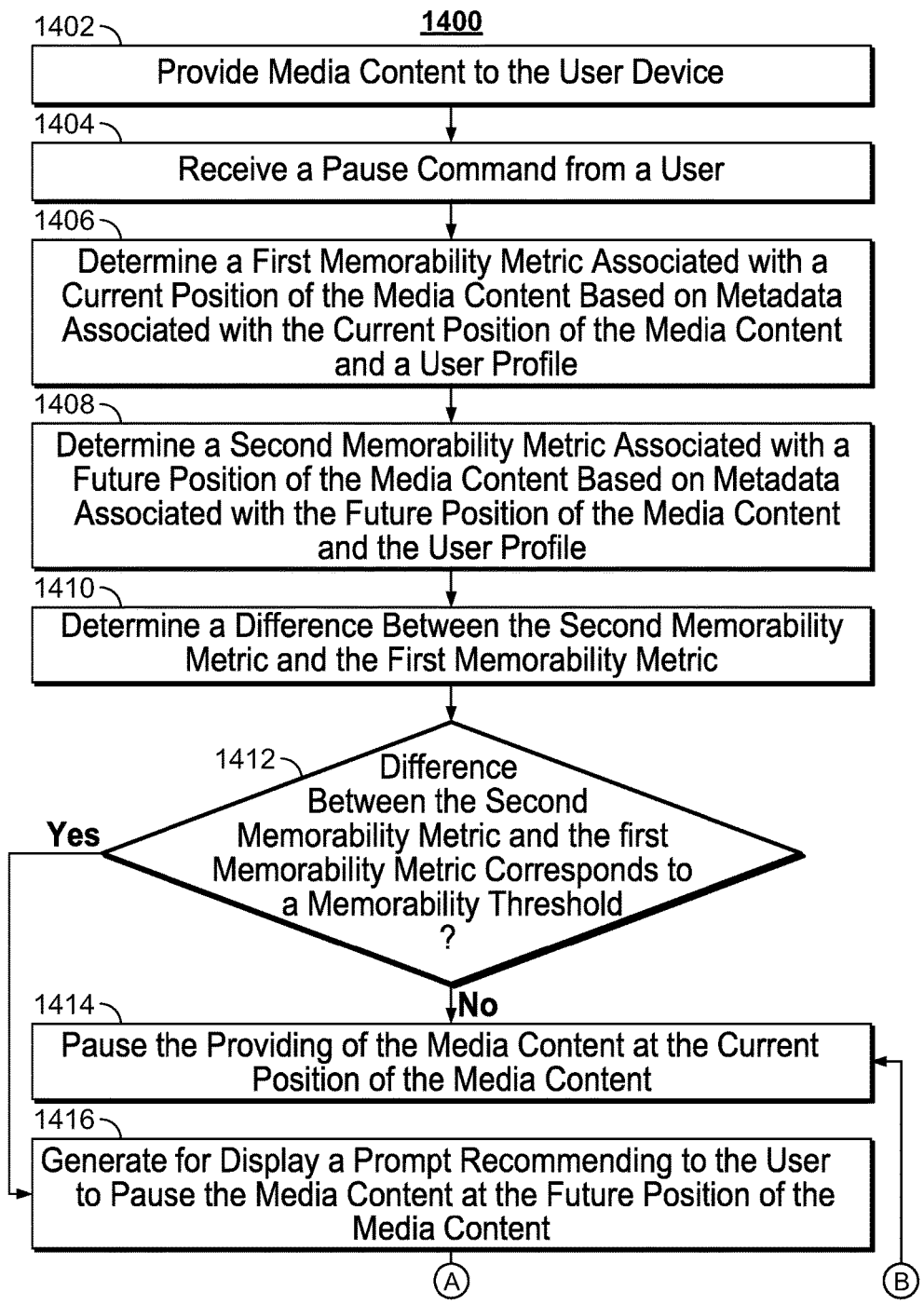
FIG. 14 depicts another illustrative flow diagram for a process of providing pause time recommendations in accordance with some embodiments of the disclosure.
Figure 14:
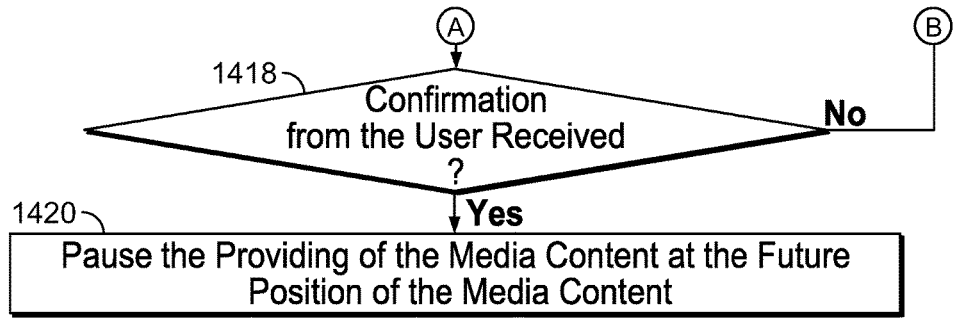

FIG. 10 depicts an illustrative flow diagram of a process 1000 for determining the user memorability profile score based on the demographic information associated with the user, and the data indicative of the user's past rewinding behavior in accordance with some embodiments of the disclosure. Process 900 may be executed by control circuitry 404 (e.g., in a manner instructed to control circuitry 404 by the media guidance application). In some embodiments, control circuitry 404 may perform process 900 as a part of block 812 described in relation to FIG. 8.

Process 1000 begins at 1002, wherein control circuitry 404 may store data indicative of the user's past rewinding behavior. For example, control circuitry 404 may detect instances of the user rewinding the media content after issuing a resume command. Such information may be stored in storage 408.

Process 1000 continues to 1004, where control circuitry 404 may maintain demographic information associated with the user. For example, demographic information associated with the user may be stored in storage 408. In some embodiments, control circuitry 404 may obtain the demographic information directly from the user. In some embodiments, control circuitry 404 may determine the demographic information based on the user's actions. In some embodiments, control circuitry 404 may obtain the demographic information directly from media guidance data source 518.

Process 1000 continues to 1006, where control circuitry 404 may determine the user memorability profile score based on the demographic information associated with the user, and the data indicative of the user's past rewinding behavior. For example, control circuitry 404 may determine that the user is young and is likely to have a better memory, in which case the user memorability profile score may be increased. In another example, control circuitry 404 may determine that the user is older and is likely to have worse memory. In which case the user memorability profile score may be decreased. In some embodiments, a pattern of a player habitually rewinding the media content after resuming the media content may cause control circuitry 404 to decrease the memorability profile score. For example, if the user memorability profile score was determined to be average memory based on demographics information, control circuitry 404 may decrease the user memorability profile score to poor memory, if the user habitually rewinds rewinding the media content after resuming the media content.

FIG. 11 depicts an illustrative flow diagram of an illustrative table 1100 that may be used by control circuitry 404 for calculating a memorability time value in accordance with some embodiments of the disclosure. In some embodiments, control circuitry 404 may use table 1100, at block 814 described in relation to FIG. 8.

In some embodiments, control circuitry 404 may use table 1100 to determine the memorability time value by selecting a time value associated with both the memorability metric of a scene and the user memorability profile score. In some embodiments, the memorability metric of a scene may be determined by control circuitry 404 to be one of: "not-memorable" score; "memorable" score, and "highly memorable" score. In some embodiments, the user memorability profile score may be determined by control circuitry 404 to be one of: poor memory, average memory, and strong memory.

In some embodiments, control circuitry 404 may determine the memorability time value by referencing table 100. For example, if the memorability metric of the current scene was highly memorable and user memorability profile score was average memory, control circuitry 404 may look up the column based on the memorability metric, and look up the row based on the user memorability profile score and extract the corresponding value ("5 days" in this case). In some embodiments, any other table with any other time values may be used by the control circuitry 404. In some embodiments, the time scores may be empirically predetermined.

FIG. 12 depicts an illustrative flow diagram of a process 1200 for setting a catch-up time in accordance with some embodiments of the disclosure. Process 1200 may be executed by control circuitry 404 (e.g., in a manner instructed to control circuitry 404 by the media guidance application). In some embodiments, control circuitry 404 may perform process 1200 as a part of block 824 described in relation to FIG. 8.

Process 1200 begins at 1202, wherein control circuitry 404 may determine a plurality of respective additional memorability metrics for each of a plurality of scenes that precede the position where the media content was paused. For example, control circuitry 404 may identify three scenes that precede the current scene. In some embodiments, control circuitry 404 may determine a memorability metric for each of the three scenes. Each memorability metric may be determined, for example, using techniques described above, in relation to block 810.

Process 1200 continues to 1204, wherein control circuitry 404 may identify a scene of the plurality of scenes with the highest respective additional memorability metric. For example, if one of the three scenes is determined to be highly memorable, while the other two scenes only have memorable memorability metrics, control circuitry 404 may identify the scene that has the highly memorable memorability metric.

Process 1200 continues to 1206, where control circuitry 404 may set a catch-up time value to the first value, such that the resume position for the media content will correspond to a beginning of the identified scene.

FIG. 13 depicts an illustrative flow diagram of a process 1300 for providing the media content summary in accordance with some embodiments of the disclosure. Process 1200 may be executed by control circuitry 404 (e.g., in a manner instructed to control circuitry 404 by the media guidance application). In some embodiments, control circuitry 404 may perform process 1300 as a part of block 830 described in relation to FIG. 8.

Process 1300 begins at 1302, wherein control circuitry 404 may generate a media content summary of a portion of the media content between the resume position and the position where the media content was paused. For example, if the resume position is three minutes before the position where the media content was paused, control circuitry 404 may generate a summary of a three-minute portion of the media content between the resume position and the position where the media content was paused. For example, control circuitry 404 may generate a slide show of that portion of the media content, or provide some parts of that portion of the media content at an increased speed.

Process 1300 may continue to 1304, where control circuitry 404 may provide the media content summary instead of providing the portion of the media content between the resume position and the position where the media content was paused. For example, control circuitry 404 may show a slide show before resuming regular playback of the media content at the point where the media content was paused.

FIG. 1400 depicts an illustrative flow diagram of a process 1400 for providing pause time recommendations in accordance with some embodiments of the disclosure. Process 1400 may be executed by control circuitry 404, for example, in a manner instructed to control circuitry 404 by the media guidance application.

Process 1400 begins at 1402, wherein control circuitry 404 provides media content to the user device. For example, the media guidance application running on control circuitry 404 may generate a media content for display on a display 412 of user television equipment 502. The media content may be generated for display by way of an explicit user selection to play the video, as a result of the user equipment being powered on, or by any other triggering event.

Process 1400 continues to 1404, where control circuitry 404 receives a pause command from the user. In some embodiments, control circuitry 404 may receive the pause command via user input interface 410. In some embodiments, control circuitry 404 may receive a pause command from a user via pause input 160 of FIG. 1B.

Process 1400 continues to 1406, where control circuitry 404 may, in response to receiving a pause command from a user, determine a first memorability metric associated with a current position of the media content based on metadata associated with the current position of the media content and a user profile. In some embodiments, control circuitry 404 may determine the first memorability metric of a scene associated with the current position of the media content. In some embodiments, control circuitry 404 may determine the first memorability metric using techniques described above in relation to block 810 of FIG. 8. In some embodiments, control circuitry 404 may determine the first memorability metric using techniques described above in relation to block 814 of FIG. 8.

In some embodiments, control circuitry 404 may determine the first memorability metric based on at least one of closed caption data associated with the current position of the media content, sound data associated with the current position of the media content, background music data associated with the current position of the media content, and audience engagement associated with the current position of the media content.

In some embodiments, control circuitry 404 may identify a current scene associated with the current position of the media content, retrieve social media data related to the identified current scene from at least one social media platform, and use this social media data to determine the first memorability metric. In some embodiments, control circuitry 404 may perform these steps similarly to the way described in relation to FIG. 9.

Process 1400 continues to 1408, where control circuitry 404 may, in response to receiving a pause command from a user, determine a second memorability metric associated with a future position of the media content based on metadata associated with the future position of the media content and a user profile. In some embodiments, control circuitry 404 may determine the memorability metric of a future scene associated with the future position of the media content. In some embodiments, control circuitry 404 may determine the second memorability metric using techniques described above in relation to block 810 of FIG. 8. In some embodiments, control circuitry 404 may determine the second memorability metric using techniques described above in relation to block 814 of FIG. 8.

In some embodiments, control circuitry 404 may determine the second memorability metric based on at least one of closed caption data associated with the current position of the media content, sound data associated with the current position of the media content, background music data associated with the current position of the media content, and audience engagement associated with the current position of the media content.

In some embodiments, control circuitry 404 may identify a current scene associated with the current position of the media content, retrieve social media data related to the identified current scene from at least one social media platform, and use this social media data to determine the second memorability metric. In some embodiments, control circuitry 404 may perform these steps similarly to the way described in relation to FIG. 9.

Process 1400 continues to 1410, where control circuitry 404 may determine a difference between the second memorability metric and the first memorability metric. For example, first and second memorability metrics may be memorability time values. That is, the first memorability metric may have a value of "12 hours," while the second memorability metric may have a value of "3 days." That is, the user may be expected to remember the first scene for 12 hours and the second scene for three days. In this example, control circuitry 404 would determine the difference between the second memorability metric and the first memorability metric to be 60 hours.

Process 1400 continues to 1412, where control circuitry 404 may determine whether the difference between the second memorability metric and the first memorability metric corresponds to a memorability threshold. For example, the memorability threshold may be 24 hours." That is, control circuitry 404 may determine if the second scene is likely to be remembered for 24 hours longer than the first scene. For example, if the first memorability metric may have a value of "12 hours," while the second memorability metric has a value of "3 days," control circuitry 404 may determine that the difference corresponds to (e.g., exceeds) the threshold of 24 hours.

In some embodiments, control circuitry 404 may proceed to block 1414 if the difference between the second memorability metric and the first memorability metric corresponds to a memorability threshold. In some embodiments, control circuitry 404 may proceed to block 1414 if the difference between the second memorability metric and the first memorability metric does not correspond to a memorability threshold.

Process 1400 continues to 1416, where control circuitry 404 generates for display a prompt recommending to the user to automatically pause the media content at the future position of the media content. For example, control circuitry 404 may generate for display future pause prompt 162 as described in relation to FIG. 1B. In some embodiments, control circuitry 404 may generate for display a prompt that displays an indication of how long the user must wait before pausing. For example, the prompt may include a message, "Please consider pausing in three minutes instead of right now." In some embodiments, control circuitry 404 may generate for display a prompt that displays a reason explaining why it would be beneficial for the user to wait before pausing. For example, the prompt may include a message, "The next scene is much more memorable; please consider pausing after the next scene."

Process 1400 continues to 1418 where control circuitry 404 checks if a confirmation was received from a user. For example, confirmation may be received via user input field 164 described in relation to FIG. 1B. For example, the user may click a "yes" button when prompted if he wasn't advised to pause at a later time. If the confirmation was received, control circuitry 404 may proceed to block 1420. If the confirmation was not received, control circuitry 404 may proceed to block 1414.

If process 1400 continues to 1420, control circuitry 404 may automatically pause the providing of the media content at the future position of the media content. For example, if the user accepted the recommendation to pause in three minutes, control circuitry 404 may automatically (without receiving a user request to pause) pause the playback of the media content at a position that is three minutes after the position where the media content was paused. For example, control circuitry 404 may store a timestamp identifying a point in the media content where the pause will automatically occur. For example, if the media content was paused at the 32 minute mark and control circuitry 404 determined that the pause should occur in three minutes, control circuitry 404 may store a timestamp that includes a value "35 minutes." Control circuitry 404 may then monitor the providing of the media content, and determine when the positions of the media content matches the position identified by the stored timestamp. In some embodiments, control circuitry 404 may then automatically pause the providing of the media content.

If process 1400 continues to 1414, control circuitry 404 may in response to determining that the difference between the second memorability metric and the first memorability metric does not correspond to the threshold, pause the providing of the media content at the current position of the media content. In some embodiments, control circuitry 404 may also pause providing the media content after the user fails to confirm a future pause suggestion.

Figure 15:
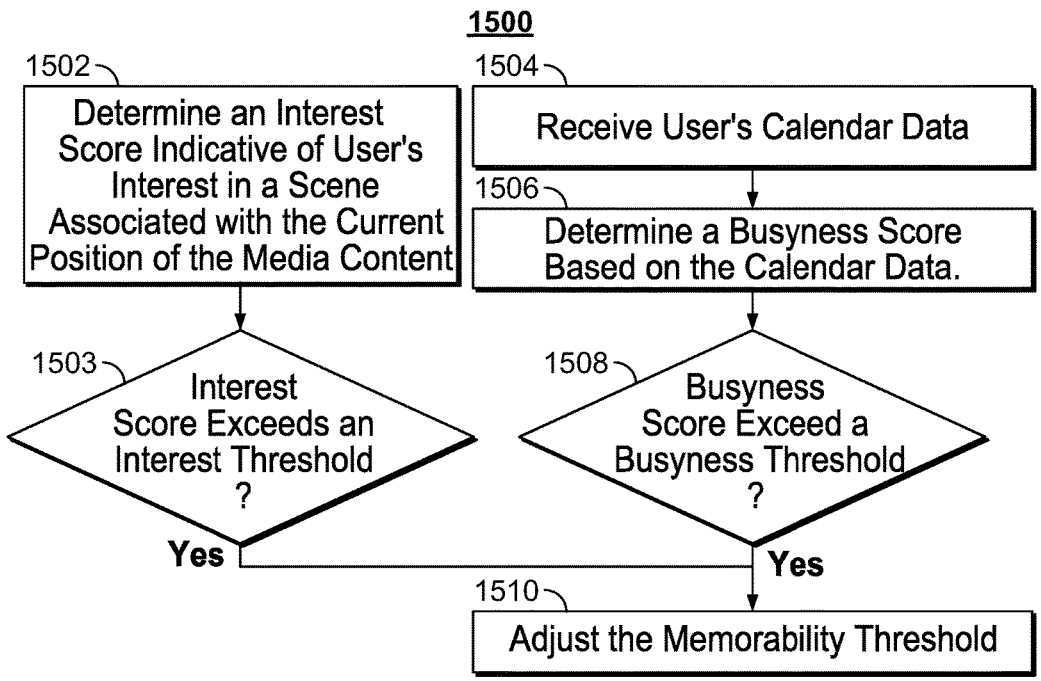
FIG. 15 depicts an illustrative flow diagram for a process of adjusting the memorability threshold in accordance with some embodiments of the disclosure.

FIG. 15 depicts an illustrative flow diagram of a process 1500 for adjusting the memorability threshold in accordance with some embodiments of the disclosure. Process 1200 may be executed by control circuitry 404 (e.g., in a manner instructed to control circuitry 404 by the media guidance application). In some embodiments, control circuitry 404 may perform process 1500 as a part of block 1412 described in relation to FIG. 14.

In some embodiments, process 1500 begins at 1502, wherein control circuitry 404 may determine an interest score indicative of user's interest in a scene associated with the current position of the media content. For example, control circuitry 404 may track user input, user's communication using other devices, or any other data about the user to gage the user's interest in the current scene.

Process 1500 continues to 1503, where the control circuitry 404 may check if the interest score exceeds an interest threshold. In some embodiments, control circuitry 404 may thus check if the user is sufficiently interested in the current scene. If the interest score exceeds the interest threshold, control circuitry 404 may proceed to block 1510.

In some embodiments, process 1500 continues at 1504, where control circuitry 404 may receive the user's calendar data. For example, the calendar data may be received from user computer equipment 504. The calendar data may include a list of tasks and appointments.

Process 1500 may continue to 1506, where the control circuitry 404 may determine a busyness score based on the calendar data. For example, presence of a high number of tasks or near appointments may increase the busyness score.

Process 1500 may continue to 1506, where the control circuitry 404 may check if the busyness score exceeds a busyness threshold. In some embodiments, control circuitry 404 may thus check if the user is sufficiently busy. If the busyness score exceeds the busyness threshold, control circuitry 404 may proceed to block 1510.

Process 1500 may continue to 1510, where control circuitry 404 adjusts the memorability threshold. In some embodiments, control circuitry 404 increases the memorability threshold to make process 1400 less likely to enter block 1416. In effect, if the user is busy or is interested in the current scene, control circuitry 404 makes it less likely that a prompt to pause at the future positions is displayed.

Figure 16:
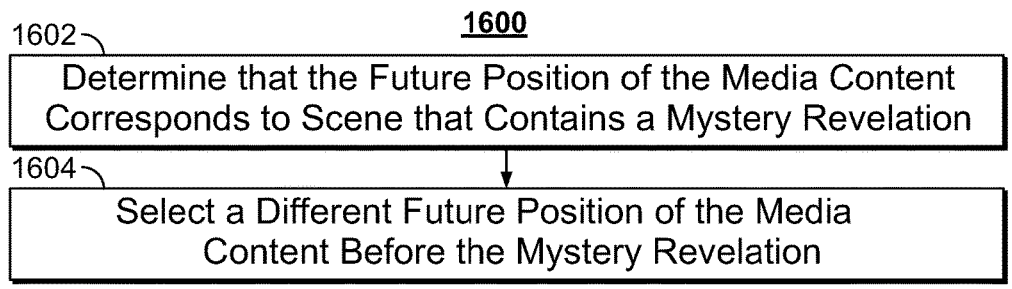
FIG. 16 depicts an illustrative flow diagram for a process of selecting a different future position of the media content before the mystery revelation in accordance with some embodiments of the disclosure.

FIG. 16 depicts an illustrative flow diagram of a process 1600 for selecting a different future position of the media content before the mystery revelation in accordance with some embodiments of the disclosure. Process 1200 may be executed by control circuitry 404 (e.g., in a manner instructed to control circuitry 404 by the media guidance application). In some embodiments, control circuitry 404 may perform process 1600 as a part of block 1408 described in relation to FIG. 14.

Process 1600 begins at 1602, where control circuitry 404 determines that the future position of the media content corresponds to a scene that contains a mystery revelation. For example, an identity of a murderer may be revealed at the future position. In some embodiments, control circuitry 404 may use metadata of the media content to make such a determination.

Process 1600 continues to 1604, where control circuitry 404 may, in response to determining that the future position of the media content corresponds to scene that contains a mystery revelation, select a different future position of the media content before the mystery revelation. For example, if the user requested a pause at the "hour, 30 minute position of the media content, and the mystery revelation occurs at the 1 hour, 40 minute position, control circuitry 404 may select a future position of the media content to be after 1 hour, 30 minutes but before 1 hour, 40 minutes. In some embodiments, this is done to maintain the user's interest in the media content, which may be lost after a mystery revelation.

Figure 17:
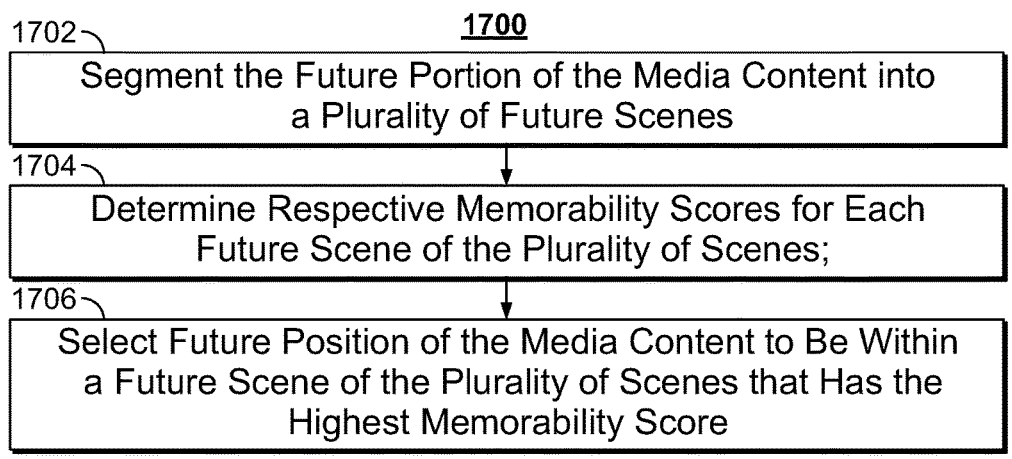
FIG. 17 depicts an illustrative flow diagram for a process of selecting a future position of the media content in accordance with some embodiments of the disclosure.

FIG. 17 depicts an illustrative flow diagram of a process 1700 for selecting a future position of the media content in accordance with some embodiments of the disclosure. Process 1200 may be executed by control circuitry 404 (e.g., in a manner instructed to control circuitry 404 by the media guidance application). In some embodiments, control circuitry 404 may perform process 1600 as a part of block 1408 described in relation to FIG. 14.

Process 1700 begins at 1702, where control circuitry 404 may segment the future portion of the media content into a plurality of future scenes. For example, control circuitry 404 may select the scenes that follow the current scene. In some embodiments, control circuitry 404 may segment the media content based on metadata provided by media guidance sources 518.

Process 1700 continues to 1704, where control circuitry 404 may determine respective memorability scores for each future scene of the plurality of scenes. For example, control circuitry 404 may determine a memorability metric for each of the three scenes that follow the current scene. In some embodiments, control circuitry 404 may determine the memorability metrics similarly to the way described in relation to blocks 1406 and 1408 of FIG. 14.

Process 1700 continues to 1706, where control circuitry 404 may select the future position of the media content to be within a future scene of the plurality of scenes that has the highest memorability metric. For example, if one of the three future scenes has a memorability metric highly memorable, while the other two scenes are merely memorable or even not memorable, control circuitry 404 may select the select the future position of the media content to be within the future scene that has the highly memorable memorability metric.

It should be noted that processes 600-1300, or any step thereof, could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, or 506 (FIG. 5). In addition, one or more steps of processes 600 and 700 may be incorporated into, or combined with, one or more steps of any other process or embodiment.

It is contemplated that the steps or descriptions of each of FIGS. 6-17 may be used with any other embodiment of this disclosure. It is contemplated that some steps or descriptions of each of FIGS. 6-17 may be optional and mat be omitted in some embodiments. In addition, the steps and descriptions described in relation to FIGS. 6-17 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-17.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518.

The processes discussed above in FIGS. 6-17 are intended to be illustrative and not limiting. One skilled in the art would appreciate that the steps of the processes in FIGS. 6-17 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for resuming playback of a media content, the method comprising:
   providing media content to the user device;
   in response to receiving a pause command from the user:
   pausing the providing of the media content;
   generating a first timestamp that identifies the time at which the pause command was received from the user; and
   determining a memorability metric of a scene associated with a position where the media content was paused based on the metadata of the scene;
   determining a user memorability profile score of the user based on a user profile,
   calculating a memorability time value based on the memorability metric of the scene and based on the user memorability profile score of the user;
   in response to receiving a resume command from the user:
   generating a second timestamp that identifies the time at which the resume command was received from the user;
   determining a pause time value by subtracting a time value of the first timestamp from a time value of the second timestamp;
   in response to determining that the pause time value exceeds the memorability time value, setting a catch-up time value to a first value;
   in response to determining that the pause time value does not exceed the memorability time value, setting the catch-up time value to a second value different from the first value;

determining a resume position for the media content by subtracting the catch-up time value from a time of the position where the media content was paused; and
resuming the providing of the media content at the resume position.

2. The method of claim 1, wherein the memorability metric of a scene is determined based on at least one of: closed caption data of the scene, sound data of the scene, background music data of the scene, and audience engagement data of the scene.

3. The method of claim 1, further comprising:
identifying the scene associated with the position where the media content was paused based on the metadata of the scene;
retrieving social media data related to the identified scene from at least one social media platform; and
determining a memorability metric of a scene based on the retrieved social media data.

4. The method of claim 1, further comprising determining the user memorability profile score of the user by:
storing data indicative of user's past rewinding behavior;
maintaining demographic information associated with the user; and
determining the user memorability profile score based on the demographic information associated with the user, and the data indicative of user's past rewinding behavior.

5. The method of claim 1, further comprising:
calculating a memorability time value by selecting a time value associated with both the memorability metric of a scene and the user memorability profile score;
wherein the memorability metric of a scene comprises one of: not-memorable score; memorable score, and highly memorable score; and
wherein the user memorability profile score comprises one of: poor memory, average memory, and strong memory.

6. The method of claim 1, further comprising:
setting the catch-up time value to the second value, such that the resume position for the media content corresponds to one of: position where the media content was paused and the beginning of the scene.

7. The method of claim 1, further comprising:
setting the catch-up time value to the first value, such that the resume position for the media content corresponds to a beginning of a previous scene that precedes the scene associated with a position where the media content was paused.

8. The method of claim 1, further comprising:
determining a plurality of respective additional memorability metrics for each of a plurality of scenes that precede the position where the media content was paused;
identifying a scene of the plurality of scenes with the highest respective additional memorability metric; and
setting the catch-up time value to the first value, such that the resume position for the media content corresponds to a beginning of the identified scene.

9. The method of claim 1, further comprising:
setting the catch-up time value to the first value based on calendar data of the user.

10. The method of claim 1, further comprising:
generating a media content summary of a portion of the media content between the resume position and the position where the media content was paused; and
providing the media content summary instead of providing the portion of the media content between the resume position and the position where the media content was paused.

11. A system for resuming playback of a media content, the method comprising:
control circuitry configured to:
provide media content to the user device;
in response to receiving a pause command from the user:
pause the providing of the media content;
generate a first timestamp that identifies the time at which the pause command was received from the user; and
determine a memorability metric of a scene associated with a position where the media content was paused based on the metadata of the scene;
determine a user memorability profile score of the user based on a user profile,
calculate a memorability time value based on the memorability metric of the scene and based on the user memorability profile score of the user;
in response to receiving a resume command from the user:
generate a second timestamp that identifies the time at which the resume command was received from the user;
determine a pause time value by subtracting a time value of the first timestamp from a time value of the second timestamp;
in response to determining that the pause time value exceeds the memorability time value, set a catch-up time value to a first value;
in response to determining that the pause time value does not exceed the memorability time value, set the catch-up time value to a second value different from the first value;
determine a resume position for the media content by subtracting the catch-up time value from a time of the position where the media content was paused; and
resume the providing of the media content at the resume position.

12. The system of claim 11, wherein the memorability metric of a scene is determined based on at least one of: closed caption data of the scene, sound data of the scene, background music data of the scene, and audience engagement data of the scene.

13. The system of claim 11, wherein the control circuitry is configured to:
identify the scene associated with the position where the media content was paused based on the metadata of the scene;
retrieve social media data related to the identified scene from at least one social media platform; and
determine a memorability metric of a scene based on the retrieved social media data.

14. The system of claim 11, wherein the control circuitry is configured to determine the user memorability profile score of the user by:
storing data indicative of user's past rewinding behavior;
maintaining demographic information associated with the user; and
determining the user memorability profile score based on the demographic information associated with the user, and the data indicative of user's past rewinding behavior.

15. The system of claim 11, wherein the control circuitry is configured to:

calculate a memorability time value by selecting a time value associated with both the memorability metric of a scene and the user memorability profile score;

wherein the memorability metric of a scene comprises one of: not-memorable score; memorable score, and highly memorable score; and wherein the user memorability profile score comprises one of: poor memory, average memory, and strong memory.

16. The system of claim 11, wherein the control circuitry is configured to:

set the catch-up time value to the second value, such that the resume position for the media content corresponds to one of: position where the media content was paused and the beginning of the scene.

17. The system of claim 11, wherein the control circuitry is configured to:

set the catch-up time value to the first value, such that the resume position for the media content corresponds to a beginning of a previous scene that precedes the scene associated with a position where the media content was paused.

18. The system of claim 11, wherein the control circuitry is configured to:

determine a plurality of respective additional memorability metrics for each of a plurality of scenes that precede the position where the media content was paused;

identify a scene of the plurality of scenes with the highest respective additional memorability metric; and set the catch-up time value to the first value, such that the resume position for the media content corresponds to a beginning of the identified scene.

19. The system of claim 11, wherein the control circuitry is configured to:

set the catch-up time value to the first value based on calendar data of the user.

20. The system of claim 11, wherein the control circuitry is configured to:

generate a media content summary of a portion of the media content between the resume position and the position where the media content was paused; and provide the media content summary instead of providing the portion of the media content between the resume position and the position where the media content was paused.

* * * * *